United States Patent
Asami et al.

(10) Patent No.: US 9,889,842 B2
(45) Date of Patent: Feb. 13, 2018

(54) HYBRID VEHICLE, CONTROLLER FOR HYBRID VEHICLE, AND CONTROL METHOD FOR HYBRID VEHICLE

(71) Applicant: TOYOTA JIDOSHA KABUSHIKI KAISHA, Toyota-shi, Aichi-ken (JP)

(72) Inventors: Yoshikazu Asami, Gotenba (JP); Toshikazu Kato, Toyota (JP); Ryuta Teraya, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/128,584

(22) PCT Filed: Mar. 25, 2015

(86) PCT No.: PCT/IB2015/000391
§ 371 (c)(1),
(2) Date: Sep. 23, 2016

(87) PCT Pub. No.: WO2015/145242
PCT Pub. Date: Oct. 1, 2015

(65) Prior Publication Data
US 2017/0120894 A1 May 4, 2017

(30) Foreign Application Priority Data
Mar. 26, 2014 (JP) .................. 2014-063660

(51) Int. Cl.
*B60W 20/00* (2016.01)
*B60W 10/06* (2006.01)
(Continued)

(52) U.S. Cl.
CPC ............ *B60W 20/16* (2016.01); *B60W 10/06* (2013.01); *B60W 10/08* (2013.01);
(Continued)

(58) Field of Classification Search
CPC ...... B60W 20/16; B60W 10/06; B60W 10/08; B60W 30/192; B60W 2510/0676;
(Continued)

(56) References Cited

U.S. PATENT DOCUMENTS

2004/0118367 A1   6/2004   Ezaki et al.
2011/0307135 A1   12/2011  Ikeda et al.
(Continued)

FOREIGN PATENT DOCUMENTS

EP   1 428 991 A1   6/2004
JP   9-242519       9/1997
(Continued)

*Primary Examiner* — Aaron L Troost
(74) *Attorney, Agent, or Firm* — Finnegan, Henderson, Farabow, Garrett & Dunner, LLP

(57) ABSTRACT

A controller of a hybrid vehicle is configured to operate the internal combustion engine with ignition timing of the internal combustion engine during the execution of the first warm-up control for operating the internal combustion engine at a first operating point further on a retard side than ignition timing of the internal combustion engine during the execution of the second warm-up control for operating the internal combustion engine at a second operating point, regardless of the driving force required for traveling after the execution of the first warm up control. The controller is configured to set the output of the internal combustion engine and the operation characteristic of the intake valve in accordance with a predetermined characteristic relationship in which the output of the internal combustion engine and the operation characteristic of the intake valve correspond to each other during the execution of the second warm-up control.

9 Claims, 13 Drawing Sheets

(51) Int. Cl.
*B60W 10/08* (2006.01)
*F02D 41/02* (2006.01)
*F02D 13/02* (2006.01)
*B60W 30/192* (2012.01)
*F02D 29/02* (2006.01)
*B60K 6/44* (2007.10)
*B60K 6/46* (2007.10)
*B60W 20/16* (2016.01)
*F02D 41/00* (2006.01)

(52) U.S. Cl.
CPC ......... *B60W 30/192* (2013.01); *F02D 13/023* (2013.01); *F02D 13/0269* (2013.01); *F02D 29/02* (2013.01); *F02D 41/0245* (2013.01); *B60K 6/44* (2013.01); *B60K 6/46* (2013.01); *B60W 2510/068* (2013.01); *B60W 2510/0676* (2013.01); *B60W 2530/12* (2013.01); *B60W 2540/10* (2013.01); *B60W 2710/0677* (2013.01); *B60W 2710/0694* (2013.01); *B60Y 2200/92* (2013.01); *B60Y 2300/436* (2013.01); *B60Y 2300/437* (2013.01); *B60Y 2300/474* (2013.01); *B60Y 2400/302* (2013.01); *F02D 2013/0292* (2013.01); *F02D 2041/001* (2013.01); *Y02T 10/142* (2013.01); *Y02T 10/26* (2013.01); *Y02T 10/54* (2013.01); *Y02T 10/623* (2013.01); *Y02T 10/6286* (2013.01); *Y10S 903/905* (2013.01); *Y10S 903/93* (2013.01)

(58) Field of Classification Search
CPC ....... B60W 2510/068; B60W 2530/12; B60W 2540/10; B60W 27/0677; B60W 2710/0694; F02D 13/023; F02D 13/0269; F02D 29/02; F02D 41/0245; F02D 2013/0292; F02D 2041/001; B60K 6/44; B60K 6/46; B60Y 2200/92; B60Y 2300/436; B60Y 2300/437; B60Y 2300/474; B60Y 2400/302; Y02T 10/142; Y02T 10/26; Y02T 10/54; Y02T 10/623; Y02T 10/6286; Y10S 903/905; Y10S 903/93

See application file for complete search history.

(56) References Cited

U.S. PATENT DOCUMENTS

| | | |
|---|---|---|
| 2012/0132163 A1 | 5/2012 | Shoji et al. |
| 2014/0007561 A1 | 1/2014 | Habu et al. |

FOREIGN PATENT DOCUMENTS

| | | |
|---|---|---|
| JP | 2004-183610 | 7/2004 |
| JP | 2005-320911 | 11/2005 |
| JP | 2008-25550 | 2/2008 |
| JP | 2009-108720 | 5/2009 |
| JP | 2009-174462 | 8/2009 |
| JP | 2010-208394 | 9/2010 |
| JP | 2011-47296 | 3/2011 |
| JP | 2012-40915 | 3/2012 |
| JP | 2012-117376 | 6/2012 |
| JP | 2013-53610 | 3/2013 |
| JP | 2015-117656 | 6/2015 |
| WO | WO 2015/092509 A1 | 6/2015 |
| WO | WO 2015/092510 A2 | 6/2015 |
| WO | WO 2015/128721 A2 | 9/2015 |

HYBRID VEHICLE, CONTROLLER FOR HYBRID VEHICLE, AND CONTROL METHOD FOR HYBRID VEHICLE

CROSS-REFERENCE TO RELATED APPLICATIONS

This application is a national phase application of International Application No. PCT/IB2015/000391, filed Mar. 25, 2015, and claims the priority of Japanese Application No. 2014-063660, filed Mar. 26, 2014, the content of both of which is incorporated herein by reference.

BACKGROUND OF THE INVENTION

1. Field of the Invention

The invention relates to a hybrid vehicle, a controller for a hybrid vehicle, and a control method for a hybrid vehicle and, more particularly, to catalyst warm-up control in a hybrid vehicle that is provided with an internal combustion engine which includes a variable valve actuating device for changing an operation characteristic of an intake valve.

2. Description of Related Art

An exhaust emission control device including a catalyst is used so as to control an exhaust emission of an internal combustion engine. The temperature of the catalyst should be raised in order for the catalyst to fulfill a sufficient purification function.

As an example, Japanese Patent Application Publication No. 2012-40915 (JP 2012-40915 A) discloses a hybrid vehicle in which catalyst warm-up control for performing warm-up on the catalyst of the exhaust emission control device is executed. When the catalyst warm-up is required in this hybrid vehicle, the internal combustion engine is operated at a first operating point at which ignition timing of the internal combustion engine is on a retard side, and then the internal combustion engine is operated at a second operating point, at which an output demand for the internal combustion engine is fixed, with the ignition timing returned after the temperature in a catalyst end portion is raised. After the catalyst warm-up is completed, the process proceeds to a normal operation for changing the output demand for the internal combustion engine based on an output demand for the entire vehicle (refer to JP 2012-40915 A).

In addition, internal combustion engines that have variable valve actuating devices which are capable of changing operation characteristics of intake valves have been known. As such variable valve actuating devices, variable valve actuating devices that are capable of changing at least one of a valve lift and a valve operating angle of the intake valve have been known (refer to Japanese Patent Application Publication No. 2009-108720, Japanese Patent Application Publication No. 2004-183610, Japanese Patent Application Publication No. 2013-53610, Japanese Patent Application Publication No. 2008-25550, Japanese Patent Application Publication No. 2012-117376, Japanese Patent Application Publication No. 9-242519, and the like).

SUMMARY OF THE INVENTION

At the first operating point and the second operating point, the second operating point being an operating point at which the output (Pe) of the internal combustion engine is fixed after the returning of the ignition timing, of the hybrid vehicle described in JP 2012-40915 A, Pe is set not to exceed a purification capacity of the catalyst during the warm-up regardless of traveling power that is required for traveling. However, in JP 2012-40915 A, no particular description is provided as to the operation characteristic of the intake valve during the catalyst warm-up control.

Accordingly, during the execution of the catalyst warm-up control for the hybrid vehicle as in JP 2012-40915 A, emission or fuel economy deterioration may occur when there is the lack of harmony between the output (Pe) of the internal combustion engine and the operation characteristic (valve lift and/or valve operating angle) of the intake valve.

The invention provides a hybrid vehicle that is capable of improving fuel economy and emission during catalyst warm-up control, a controller for a hybrid vehicle, and a control method for a hybrid vehicle.

A hybrid vehicle according to a first aspect of the invention includes an electric motor, an internal combustion engine, an exhaust emission control device, and a controller. The electric motor is configured to generate a driving force for the vehicle. The internal combustion engine includes a variable valve actuating device. The variable valve actuating device is configured to control at least one of a valve lift and a valve operating angle as an operation characteristic of an intake valve. The exhaust emission control device is configured to control an exhaust emission of the internal combustion engine by using a catalyst. The controller is configured to execute catalyst warm-up control. The catalyst warm-up control is control for performing warm-up of the catalyst of the exhaust emission control device. The catalyst warm-up control includes first warm-up control and second warm-up control. The first warm-up control is control for operating the internal combustion engine at a first operating point. The second warm-up control is control for operating the internal combustion engine at a second operating point, regardless of the driving force required for traveling, after the execution of the first warm-up control. An output of the internal combustion engine at the second operating point is larger than an output of the internal combustion engine at the first operating point. The controller is configured to operate the internal combustion engine with ignition timing of the internal combustion engine during the execution of the first warm-up control further on a retard side than ignition timing of the internal combustion engine during the execution of the second warm-up control. The controller is configured to set the output of the internal combustion engine and the operation characteristic of the intake valve in accordance with a predetermined characteristic relationship during the execution of the second warm-up control. The predetermined characteristic relationship is a relationship in which the output of the internal combustion engine and the operation characteristic of the intake valve correspond to each other.

In this hybrid vehicle, the output of the internal combustion engine during the second warm-up control with a returned ignition timing can be appropriately set depending on the operation characteristic of the intake valve after the first warm-up control with a retarded ignition timing. In this manner, emission or fuel economy deterioration attributable to the lack of harmony between the output of the internal combustion engine and the operation characteristic of the intake valve can be prevented during the catalyst warm-up control (during the second warm-up control in particular). Accordingly, the emission and the fuel economy can be improved during the catalyst warm-up control.

In the above-described aspect, the characteristic relationship may be determined so that the output of the internal combustion engine decreases as at least one of the valve lift and the valve operating angle increases.

According to this configuration, an increase in the exhaust emission that is caused by an excessive increase in the output of the internal combustion engine when the valve lift and/or the valve operating angle are/is large and the fuel economy deterioration that is caused by an excessive decrease in the output of the internal combustion engine when the valve lift and/or the valve operating angle are/is small can be prevented during the second warm-up control.

In the above-described aspect, the hybrid vehicle may further include a detector. The detector is configured to detect the operation characteristic of the intake valve. The output of the internal combustion engine may be changed depending on a present operation characteristic of the intake valve in accordance with the characteristic relationship when the second warm-up control is executed and when the operation characteristic of the intake valve is changed. The present operation characteristic of the intake valve is detected by the detector.

According to this configuration, the emission or fuel economy deterioration attributable to the lack of harmony between the output of the internal combustion engine and the operation characteristic of the intake valve can be prevented even when the operation characteristic of the intake valve is changed regardless of a control command during the second warm-up control due to, for example, a control delay of the variable valve actuating device.

In the above-described aspect, the controller may be configured to set the output of the internal combustion engine in accordance with the characteristic relationship depending on a present operation characteristic of the intake valve when the second warm-up control is executed and when the change in the operation characteristic of the intake valve by the variable valve actuating device is limited. The variable valve actuating device may be configured to change the operation characteristic of the intake valve in accordance with the characteristic relationship depending on the output of the internal combustion engine set for the catalyst warm-up control when the second warm-up control is executed and the change in the operation characteristic of the intake valve by the variable valve actuating device is not limited.

According to this configuration, the output of the internal combustion engine is set depending on the present operation characteristic of the intake valve in a state where the change in the operation characteristic of the intake valve is limited. Accordingly, the emission or fuel economy deterioration attributable to the lack of harmony between the output of the internal combustion engine and the operation characteristic of the intake valve can be prevented. When control of the operation characteristic of the intake valve is normal, the output of the internal combustion engine during the second warm-up control can be set to be suitable for the catalyst warm-up control. Accordingly, the time required for the catalyst warm-up control can be shortened.

In the above-described aspect, the controller may be configured to increase the output of the internal combustion engine depending on a rise in a temperature of the catalyst when the second warm-up control is executed and when the change in the operation characteristic of the intake valve by the variable valve actuating device is not limited.

According to this configuration, the output of the internal combustion engine can be increased depending on a rise in a purification capacity of the catalyst during the second warm-up control. Accordingly, the time required for the catalyst warm-up control can be shortened by increasing the output of the internal combustion engine within a range not exceeding the purification capacity of the catalyst.

In the above-described aspect, the variable valve actuating device may be configured to change the operation characteristic of the intake valve into a first characteristic or a second characteristic. At least one of the valve lift and the valve operating angle at a time when the operation characteristic of the intake valve is the second characteristic may be larger than at least one of the valve lift and the valve operating angle at a time when the operation characteristic of the intake valve is the first characteristic. The characteristic relationship may be determined so that the output of the internal combustion engine at a time when the operation characteristic of the intake valve is the second characteristic is lower than the output of the internal combustion engine at a time when the operation characteristic of the intake valve is the first characteristic.

According to this configuration, the fuel economy and emission during the catalyst warm-up control can be improved in the hybrid vehicle on which the variable valve actuating device that controls the operation characteristic (at least one of the valve lift and the valve operating angle) of the intake valve in two stages is mounted. By switching the operation characteristic of the intake valve in the two stages, the time required for setting a control parameter for controlling an operation state of the internal combustion engine appropriate can be reduced. In addition, torque that is required for an actuator for changing the operation characteristic of the intake valve can be reduced and the actuator can become compact in size and light in weight. Actuator manufacturing costs can be reduced as well.

In the above-described aspect, the variable valve actuating device may be configured to change the operation characteristic of the intake valve into a first characteristic, a second characteristic, or a third characteristic. At least one of the valve lift and the valve operating angle at a time when the operation characteristic of the intake valve is the second characteristic may be larger than at least one of the valve lift and the valve operating angle at a time when the operation characteristic of the intake valve is the first characteristic. At least one of the valve lift and the valve operating angle at a time when the operation characteristic of the intake valve is the third characteristic may be larger than at least one of the valve lift and the valve operating angle at a time when the operation characteristic of the intake valve is the second characteristic. The characteristic relationship may be determined so that the output of the internal combustion engine at a time when the operation characteristic is the second characteristic is lower than the output of the internal combustion engine at a time when the operation characteristic is the first characteristic and the output of the internal combustion engine at a time when the operation characteristic is the third characteristic is lower than the output of the internal combustion engine at a time when the operation characteristic is the second characteristic.

According to this configuration, the fuel economy and emission during the catalyst warm-up control can be improved with the variable valve actuating device that controls the operation characteristic (at least one of the valve lift and the valve operating angle) of the intake valve in three stages. By switching the operation characteristic of the intake valve in the three stages, the setting of the operation characteristic can be further segmented while the effects of the two-stage switching of the operation characteristic of the intake valve are maintained. As a result, the fuel economy and emission can be improved more appropriately than in the two-stage switching of the operation characteristic of the intake valve.

In the above-described aspect, the first warm-up control may be control for warming up an exhaust upstream side of the catalyst and the second warm-up control may be control for warming up whole of the catalyst.

According to this configuration, the output of the internal combustion engine is increased and the second warm-up control is executed after activation of the exhaust upstream side by the first warm-up control accompanying ignition timing retardation. Accordingly, the exhaust emission can be suppressed through the catalyst warm-up control.

In the above-described aspect, the controller may be configured to control the electric motor, so that the electric motor outputs the driving force required for the traveling, during the execution of the first warm-up control and during the execution of the second warm-up control.

During the execution of the catalyst warm-up control, this hybrid vehicle travels by using the electric motor. Accordingly, the warm-up on the catalyst of the exhaust emission control device can be appropriately performed by the first warm-up control and the second warm-up control regardless of the driving force for the traveling. In addition, the fuel economy and emission during the catalyst warm-up control can be improved by setting the output of the internal combustion engine and the operation characteristic of the intake valve in conjunction with each other during the second warm-up control.

A second aspect of the invention relates to a controller for a hybrid vehicle. The hybrid vehicle includes an electric motor, an internal combustion engine, and an exhaust emission control device. The electric motor is configured to generate a driving force for the vehicle. The internal combustion engine includes a variable valve actuating device. The variable valve actuating device is configured to control at least one of a valve lift and a valve operating angle as an operation characteristic of an intake valve. The exhaust emission control device is configured to control an exhaust emission of the internal combustion engine by using a catalyst. The controller includes first warm-up control means, second warm-up control means, ignition timing setting means, and operation characteristic setting means. The first warm-up control means operates the internal combustion engine at a first operating point. The second warm-up control means operates the internal combustion engine at a second operating point. An output of the internal combustion engine at the second operating point is larger than an output of the internal combustion engine at the first operating point. The ignition timing setting means sets ignition timing of the internal combustion engine during the operation of the internal combustion engine by the first warm-up control means further on a retard side than ignition timing of the internal combustion engine during the operation of the internal combustion engine by the second warm-up control means. The operation characteristic setting means sets the output of the internal combustion engine and the operation characteristic of the intake valve during the operation of the internal combustion engine by the second warm-up control means in accordance with a predetermined characteristic relationship. The predetermined characteristic relationship is a relationship in which the output of the internal combustion engine and the operation characteristic of the intake valve correspond to each other.

A third aspect of the invention relates to a control method for a hybrid vehicle. The hybrid vehicle includes an electric motor, an internal combustion engine, an exhaust emission control device, and a controller. The electric motor is configured to generate a driving force for the vehicle. The internal combustion engine includes a variable valve actu-
ating device. The variable valve actuating device is configured to control at least one of a valve lift and a valve operating angle as an operation characteristic of an intake valve. The exhaust emission control device is configured to control an exhaust emission of the internal combustion engine by using a catalyst. The control method includes performing first warm-up control by the controller. The first warm-up control is control for operating the internal combustion engine at a first operating point. The control method includes performing second warm-up control by the controller. The second warm-up control is control for operating the internal combustion engine at a second operating point. An output of the internal combustion engine at the second operating point is larger than an output of the internal combustion engine at the first operating point. The control method includes operating the internal combustion engine by the controller with ignition timing of the internal combustion engine during an execution of the first warm-up control further on a retard side than ignition timing of the internal combustion engine during an execution of the second warm-up control. The control method includes setting the output of the internal combustion engine and the operation characteristic of the intake valve in accordance with a predetermined characteristic relationship by the controller during the execution of the second warm-up control. The predetermined characteristic relationship is a relationship in which the output of the internal combustion engine and the operation characteristic of the intake valve correspond to each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
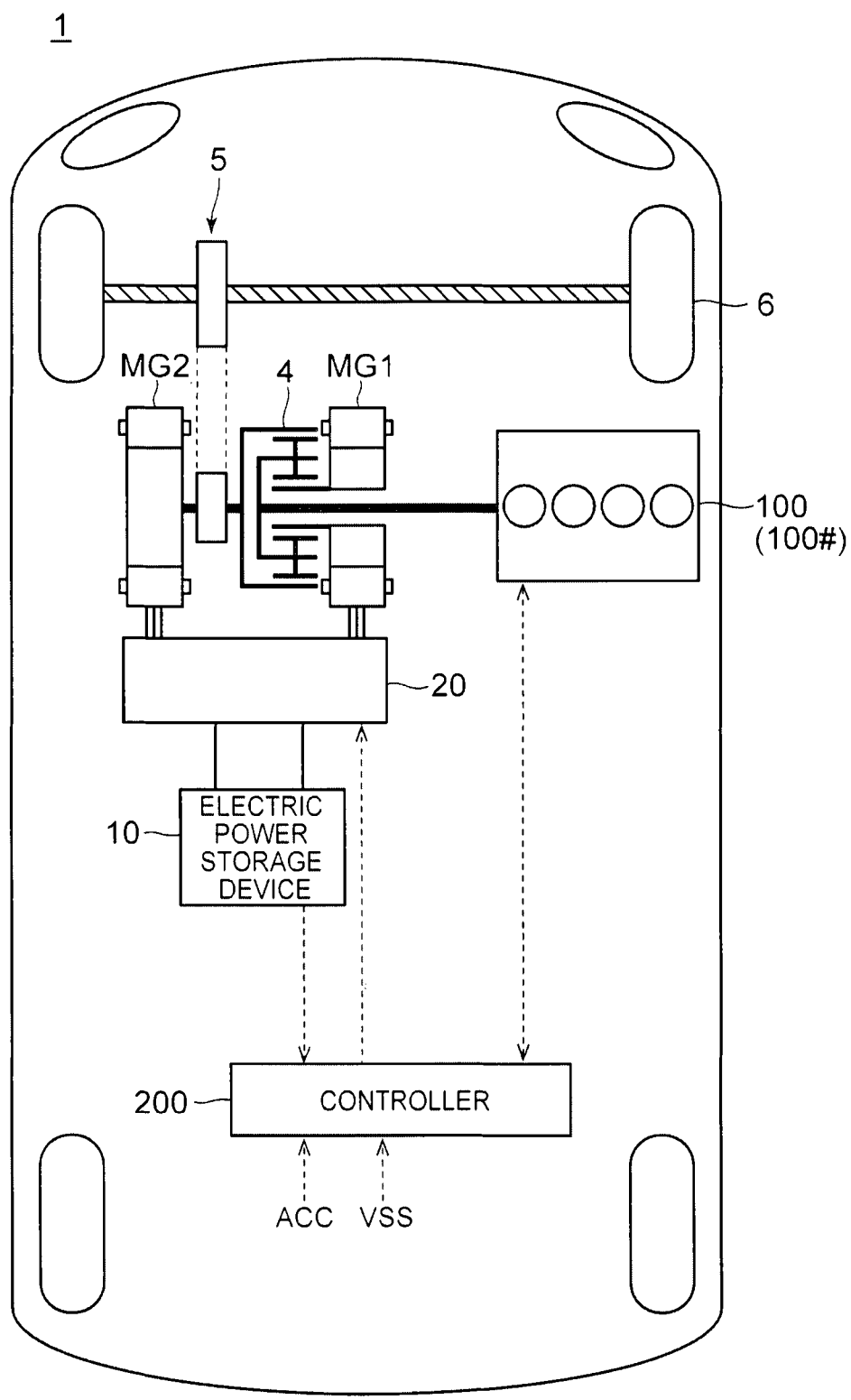
FIG. 1 is a block diagram for showing an overall configuration of a hybrid vehicle according to a first embodiment of the invention.

Hereinafter, embodiments of the invention will be described in detail with reference to accompanying drawings. A plurality of the embodiments will be described below, and appropriate combination of configurations described in the respective embodiments is scheduled from the beginning. In principle, like reference numerals will be used to refer to like or corresponding parts in the drawings and description thereof will not be repeated.

FIG. 1 is a block diagram for showing an overall configuration of a hybrid vehicle according to a first embodiment of the invention.

Referring to FIG. 1, a hybrid vehicle 1 is provided with an engine 100, motor generators MG1, MG2, a power split device 4, a decelerator 5, and drive wheels 6. In addition, the hybrid vehicle 1 is further provided with an electric power storage device 10, a power control unit (PCU) 20, and a controller 200.

The hybrid vehicle 1 is capable of traveling by using a driving force that is output from at least one of the engine 100 and the motor generator MG2. An internal combustion engine such as a gasoline engine and a diesel engine constitutes the engine 100, and the engine 100 generates the driving force for the vehicle. In addition, the engine 100 generates a driving force for driving the motor generator MG1 that can be operated as an electric power generator.

The engine 100 can be started when the engine 100 is cranked by the motor generator MG1. The engine 100 has a variable valve actuating device for changing an operation characteristic of an intake valve. The variable valve actuating device is controlled by the controller 200 in accordance with a traveling situation of the vehicle and startability of the engine 100. An exhaust emission control device that controls an exhaust emission of the engine 100 by using a catalyst is disposed in an exhaust passage of the engine 100. The engine 100, the variable valve actuating device, and the exhaust emission control device will be described in detail later.

The power split device 4 is configured to be capable of splitting the driving force that is generated by the engine 100 into a driving force for driving the drive wheels 6 and the driving force for driving the motor generator MG1 via the decelerator 5. A planetary gear, for example, constitutes the power split device 4.

The motor generators MG1, MG2 are AC rotary electric machines, and, for example, are three-phase AC synchronous motor generators. The motor generator MG1 can generate electric power by using the driving force for the engine 100 that is received via the power split device 4. For example, the engine 100 is started and the electric power generation is performed by the motor generator MG1 when an SOC of the electric power storage device 10 reaches a predetermined lower limit. The electric power that is generated by the motor generator MG1 is voltage-converted by the PCU 20, and is temporarily stored in the electric power storage device 10 or is directly supplied to the motor generator MG2.

The motor generator MG2 generates the driving force by using at least one of the electric power that is stored in the electric power storage device 10 and the electric power that is generated by the motor generator MG1. The driving force of the motor generator MG2 is transmitted to the drive wheels 6 via the decelerator 5. In FIG. 1, front wheels are illustrated as the drive wheels 6. However, the motor generator MG2 may drive rear wheels instead of the front wheels or along with the front wheels.

During braking of the vehicle, the motor generator MG2 is driven by the drive wheels 6 via the decelerator 5 and the motor generator MG2 is operated as an electric power generator. In this manner, the motor generator MG2 is operated as a regenerative brake that converts braking energy into electric power. The electric power that is generated by the motor generator MG2 is stored in the electric power storage device 10.

The PCU 20 is a drive device for driving the motor generators MG1, MG2. The PCU 20 includes an inverter for driving the motor generators MG1, MG2 and may include a converter for voltage conversion between the inverter and the electric power storage device 10.

The electric power storage device 10 is a rechargeable DC power supply and is configured to include, for example, a secondary battery such as a nickel hydrogen secondary battery and a lithium ion secondary battery. The electric power storage device 10 has a voltage of, for example, approximately 200 V. The electric power storage device 10 stores the electric power generated by the motor generators MG1, MG2. A large-capacity capacitor can be adopted as the electric power storage device 10. The electric power storage device 10 is not particularly limited insofar as the electric power storage device 10 is an electric power buffer that is capable of temporarily storing the electric power generated by the motor generators MG1, MG2 and is capable of supplying the stored electric power to the motor generator MG2. In addition, sensors for detecting a temperature, a voltage, and a current of the electric power storage device 10 are disposed in the electric power storage device 10. Values detected by the sensors are output to the controller 200.

The controller 200 is configured to include an electronic control unit (ECU) that includes a central processing unit (CPU, not illustrated), a storage device (not illustrated), an I/O buffer (not illustrated), and the like. The controller 200 inputs signal (accelerator opening ACC, vehicle speed VSS, and the like) to various sensors, outputs control signal to each instrument, and controls each instrument of the hybrid vehicle 1. The controller 200 executes, for example, traveling control for the hybrid vehicle 1, catalyst warm-up control for performing warm-up on the catalyst of the exhaust emission control device, and variable valve actuating device control in accordance with the traveling control and the catalyst warm-up control as main control. An operation of the controller 200 will be described later.

Next, a configuration of the engine that has a variable valve mechanism will be described.

Figure 2:
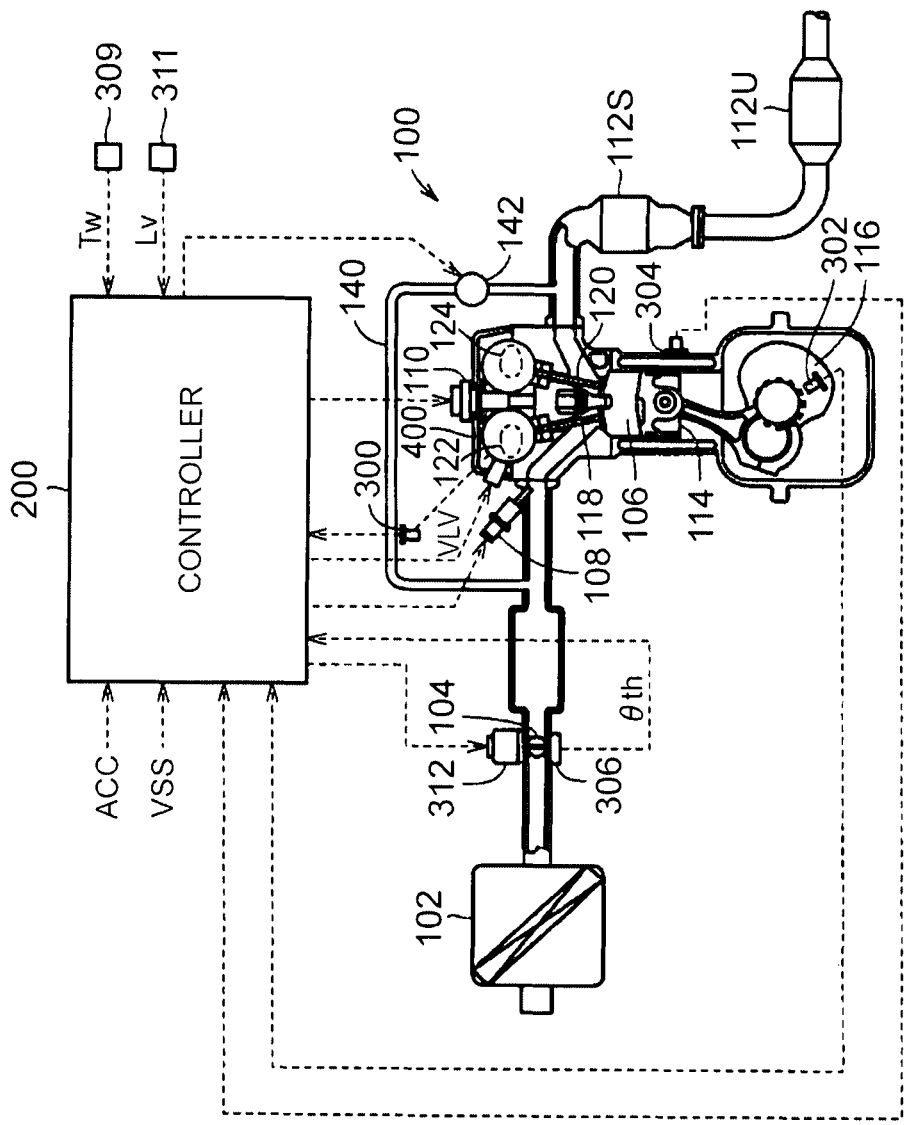
FIG. 2 is a configuration diagram of an engine that is illustrated in FIG. 1.

FIG. 2 is a diagram illustrating the configuration of the engine 100 that is illustrated in FIG. 1. Referring to FIG. 2, the amount of air intake into the engine 100 is adjusted by a throttle valve 104. The throttle valve 104 is driven by a throttle motor 312. An injector 108 injects a fuel to an intake port. At the intake port, the fuel is mixed with air. The air-fuel mixture is introduced into a cylinder 106 when an intake valve 118 is open. The injector 108 may be disposed as a direct injector that directly injects the fuel into the cylinder 106. Alternatively, both a port injector and a direct injector may be disposed as the injector 108.

The air-fuel mixture in the cylinder 106 is ignited and combusted by an ignition plug 110. The combusted air-fuel mixture, that is, an exhaust gas, is discharged to the exhaust passage. The exhaust emission control device that purifies the exhaust gas by using the catalyst is disposed in the exhaust passage. The exhaust emission control device is configured to include a catalyst 112S (hereinafter, also referred to as a "start cat (S/C) catalyst") and a catalyst 112U (hereinafter, also referred to as an "underfloor (U/F) catalyst") that is arranged on a downstream side from the S/C catalyst 112S. The exhaust gas is purified by the S/C catalyst 112S and the U/F catalyst 112U and then is discharged out of the vehicle. The combustion of the air-fuel mixture causes a piston 114 to be pushed down and a crankshaft 116 to rotate.

The intake valve 118 and an exhaust valve 120 are disposed in a top portion of the cylinder 106. The amount of the air introduced to the cylinder 106 and timing of the introduction are controlled by the intake valve 118. The amount of the exhaust gas discharged from the cylinder 106 and timing of the discharge are controlled by the exhaust valve 120. The intake valve 118 is driven by a cam 122 and the exhaust valve 120 is driven by a cam 124.

An operation characteristic of the intake valve 118 is controlled by a variable valve lift (VVL) device 400 as described in detail later. Hereinafter, an example in which a valve lift and a valve operating angle are controlled as the operation characteristics of the intake valve 118 will be described. A valve lift and/or a valve operating angle of the exhaust valve 120 may also be controlled. In addition, a variable valve timing (VVT) device that controls opening and closing timing may be combined with the VVL device 400.

The engine 100 further includes an exhaust gas recirculation (EGR) device. The EGR device includes an EGR passage 140 and an EGR valve 142. The EGR passage 140 is a pipe line for reflux of the exhaust emission of the engine 100 to an intake side. The EGR valve 142 is disposed in the EGR passage 140 and opening and closing of the EGR valve 142 is controlled by the controller 200.

When the EGR valve 142 is open, the EGR passage 140 allows an exhaust path and an air intake path to communicate with each other. When the EGR valve 142 is closed, the EGR passage 140 is blocked. When the EGR valve 142 is open and the exhaust emission is subjected to the reflux to the air intake path, a pumping loss can be reduced by reducing a throttle loss. In other words, fuel economy can be improved by the EGR device.

Signals from a cam angle sensor 300, a crank angle sensor 302, a knock sensor 304, a throttle opening sensor 306, a water temperature sensor 309, and a VVL position sensor 311 as well as the signals showing the accelerator opening ACC and the vehicle speed VSS are input into the controller 200.

The cam angle sensor 300 outputs a signal that shows a cam position. The crank angle sensor 302 outputs signals that show a speed (engine speed) of the crankshaft 116 and a rotation angle of the crankshaft 116. The knock sensor 304 outputs a signal that shows vibration intensity of the engine 100. The throttle opening sensor 306 outputs a signal that shows a throttle opening θth. The water temperature sensor 309 outputs a signal that shows a coolant temperature Tw of the engine 100.

The VVL position sensor 311 is configured to detect data that shows a present operation characteristic of the intake valve 118 which is controlled by the VVL device 400. A detection value Lv that is obtained by the VVL position sensor 311 is input into the controller 200. In other words, the controller 200 can detect current valve lift and valve operating angle values based on the detection value Lv of the VVL position sensor 311.

In addition, the controller 200 controls the engine 100 based on the signals from the sensors described above. Specifically, the controller 200 controls the throttle opening θth, ignition timing, fuel injection timing, a fuel injection amount, an operation of the EGR device (opening of the EGR valve 142), and operation states of the intake valve (opening and closing timing, valve lift, valve operating angle, and the like) so that the engine 100 is operated at a desired operating point in accordance with the traveling situation of the vehicle and a warm-up situation of the exhaust emission control device. The operating point is an operation point of the engine 100 at which power, torque, and speed of the engine 100 are determined. The operating point of the engine 100 is determined so that the engine 100 outputs desired power and torque.

In this embodiment, an example in which the engine output is controlled on a power basis is described. Accordingly, the controller 200 sets an engine power demand as an output demand to the engine 100 during the traveling control for the hybrid vehicle 1. In addition, the controller 200 controls the parameter group described above so that the engine 100 is operated at the operation point (combination of the engine speed and the engine torque) where the output is generated in accordance with the engine power demand.

Figure 3:
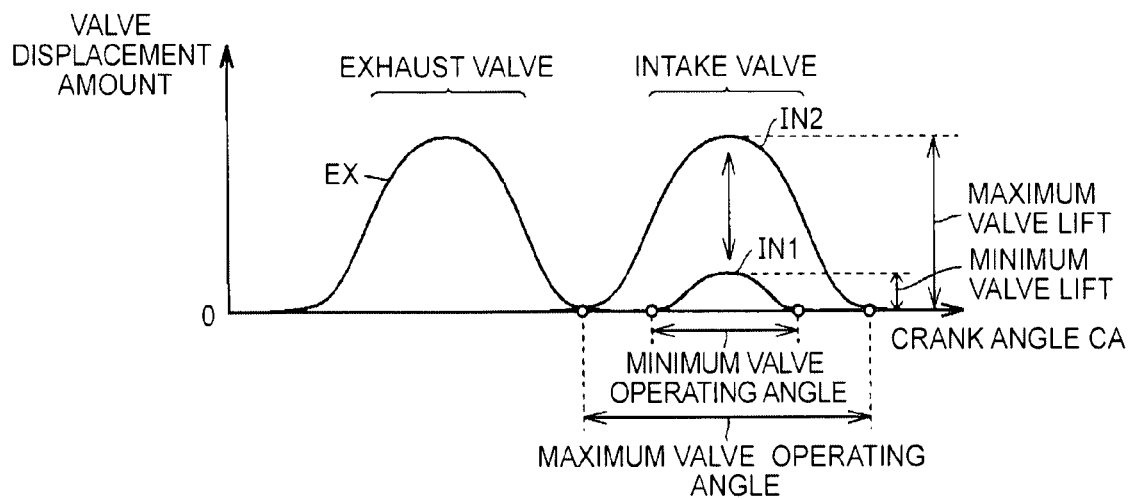
FIG. 3 is a diagram illustrating a valve displacement amount-crank angle relationship that is realized by a VVL device.

FIG. 3 is a diagram illustrating a valve displacement amount-crank angle relationship that is realized by the VVL device 400. Referring to FIG. 3, the exhaust valve 120 is opened and closed in an exhaust stroke and the intake valve 118 is opened and closed in an intake stroke. A waveform EX shows the valve displacement amount of the exhaust valve 120 and waveforms IN1, IN2 show the valve displacement amount of the intake valve 118.

The valve displacement amount is the amount of displacement of the intake valve 118 from a state where the intake valve 118 is closed. The valve lift is the valve displacement amount at a time when the opening of the intake valve 118 reaches a peak. The valve operating angle is the crank angle at a time during which the intake valve 118 is opened and then closed.

The operation characteristic of the intake valve 118 is changed between the waveforms IN1, IN2 by the VVL device 400. The waveform IN1 shows a case where the valve lift and the valve operating angle are minimized. The waveform IN2 shows a case where the valve lift and the valve operating angle are maximized. In the VVL device 400, the valve operating angle increases as the valve lift increases. In other words, in the VVL device 400 that is illustrated as an example of this embodiment, the valve lift and the valve operating angle are changed as the operation characteristics of the intake valve 118.

Figure 4:
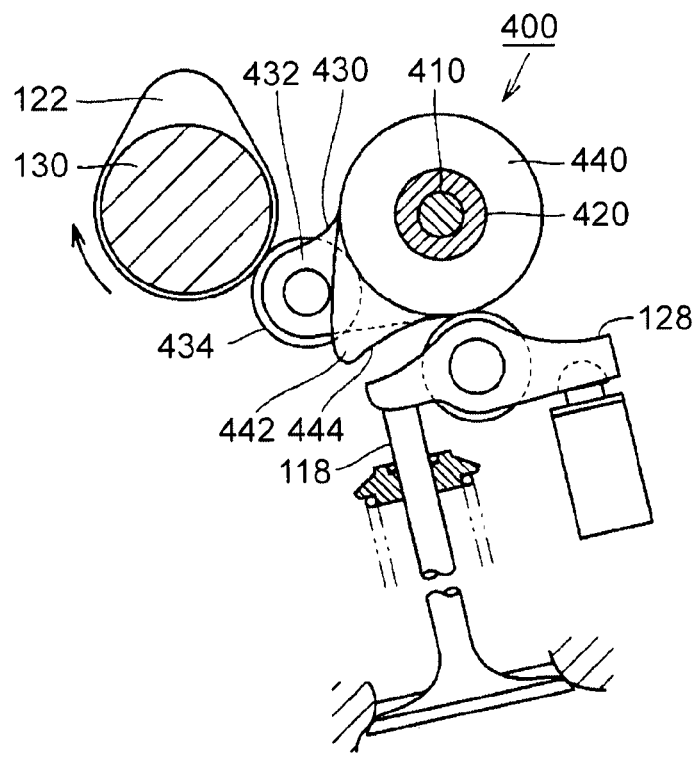
FIG. 4 is a front view of the VVL device.

FIG. 4 is a front view of the VVL device 400 that is an example of a device which controls the valve lift and the valve operating angle of the intake valve 118.

Referring to FIG. 4, the VVL device 400 is provided with a drive shaft 410 that extends in one direction, a supporting pipe 420 that covers an outer circumferential surface of the drive shaft 410, and an input arm 430 and an oscillation cam 440 that are arranged in parallel in an axial direction of the drive shaft 410 on an outer circumferential surface of the supporting pipe 420. An actuator (not illustrated) that allows the drive shaft 410 to be in linear motion is connected to a tip of the drive shaft 410.

In the VVL device 400, one input arm 430 is disposed depending on one cam 122 that is disposed in each cylinder. Two oscillation cams 440 are disposed on both respective sides of the input arm 430 depending on respectively a pair of the intake valves 118 disposed in each cylinder.

The supporting pipe 420 is formed to have a hollow cylindrical shape and is arranged in parallel to a camshaft 130. The supporting pipe 420 is fixed to a cylinder head so as not to be moved in the axial direction or rotate.

The drive shaft 410 is inserted into the supporting pipe 420 to be capable of sliding in the axial direction thereof. The input arm 430 and the two oscillation cams 440 are disposed on the outer circumferential surface of the supporting pipe 420 to be capable of oscillating about the axial center of the drive shaft 410 and not to be moved in the axial direction thereof.

The input arm 430 has an arm portion 432 that protrudes away from the outer circumferential surface of the supporting pipe 420 and a roller portion 434 that is rotatably connected to a tip of the arm portion 432. The input arm 430 is disposed so that the roller portion 434 can abut against the cam 122.

The oscillation cam 440 has a substantially triangular nose portion 442 that protrudes away from the outer circumferential surface of the supporting pipe 420. A concavely curved cam surface 444 is formed on one side of the nose portion 442. A biasing force of a valve spring that is disposed in the intake valve 118 causes a roller rotatably mounted on a rocker arm 128 to be pressed against the cam surface 444.

The input arm 430 and the oscillation cam 440 are integrated with each other and oscillate about the axial center of the drive shaft 410. Accordingly, when the camshaft 130 rotates, the input arm 430 that abuts against the cam 122 oscillates, and the oscillation cam 440 also oscillates in response to the movement of the input arm 430. The movement of the oscillation cam 440 is transmitted to the intake valve 118 through the rocker arm 128 so that the intake valve 118 is opened and closed.

The VVL device 400 is further provided with a device that changes a relative phase difference between the input arm 430 and the oscillation cam 440 around the axial center of the supporting pipe 420. The valve lift and the valve operating angle of the intake valve 118 are appropriately changed by the device that changes the relative phase difference.

When the relative phase difference between the input arm 430 and the oscillation cam 440 is increased, an oscillation angle of the rocker arm 128 with respect to oscillation angles of the input arm 430 and the oscillation cam 440 are increased. Then, the valve lift and the valve operating angle of the intake valve 118 are increased.

When the relative phase difference between the input arm 430 and the oscillation cam 440 is decreased, the oscillation angle of the rocker arm 128 with respect to the oscillation angles of the input arm 430 and the oscillation cam 440 are decreased. Then, the valve lift and the valve operating angle of the intake valve 118 are decreased.

Figure 5:
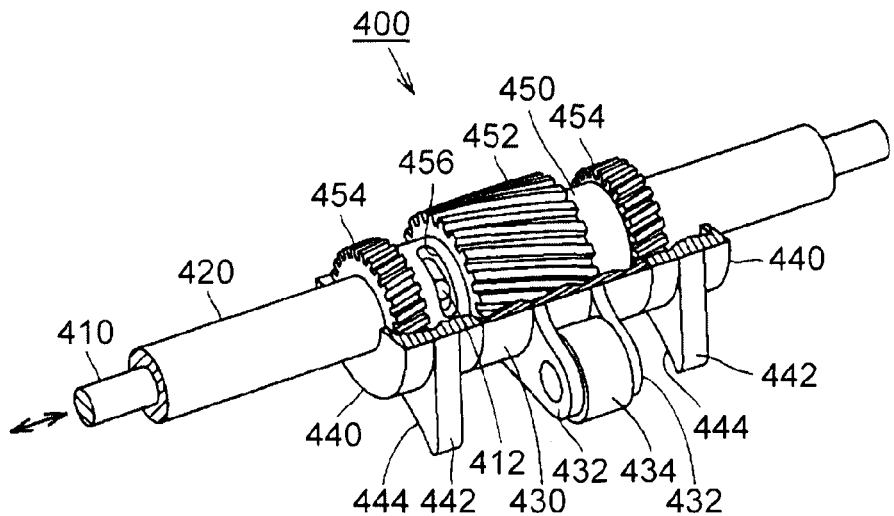
FIG. 5 is a partial perspective view illustrating the VVL device that is illustrated in FIG. 4.

FIG. 5 is a partial perspective view illustrating the VVL device 400. In FIG. 5, a part of the VVL device 400 is shown in a broken manner so that an internal structure can be clarified.

Referring to FIG. 5, a slider gear 450 that is rotatable with respect to the supporting pipe 420 and is slidably supported in the axial direction is accommodated in a space defined between the input arm 430 and the two oscillation cams 440 and the outer circumferential surface of the supporting pipe 420. The slider gear 450 is disposed to be capable of sliding in the axial direction on the supporting pipe 420.

A helical gear 452 that is positioned in an axial-direction center portion of the slider gear 450 and has a right screw spiral-shaped helical spline formed therein is disposed in the slider gear 450. In addition, helical gears 454 that are positioned on both sides of the helical gear 452 and have left screw spiral-shaped helical splines formed therein contrary to the helical gear 452 are disposed in the slider gear 450.

Helical splines corresponding to the helical gears 452, 454 are formed on respective inner circumferential surfaces of the input arm 430 and the two oscillation cams 440 that define the space in which the slider gear 450 is accommodated. In other words, the right screw spiral-shaped helical spline is formed in the input arm 430, and the helical spline is engaged with the helical gear 452. In addition, the left screw spiral-shaped helical splines are formed in the oscillation cams 440, and the helical splines are engaged with the helical gears 454.

A long hole 456 that is positioned between one of the helical gears 454 and the helical gear 452 and extends in a circumferential direction is formed in the slider gear 450. In addition, although not illustrated, a long hole that extends in the axial direction to overlap with a part of the long hole 456 is formed in the supporting pipe 420. A locking pin 412 that protrudes through the overlapping part of the long hole 456 and the long hole (not illustrated) is disposed integrally with the drive shaft 410 inserted into the supporting pipe 420.

When the drive shaft 410 is moved in the axial direction thereof by the actuator (not illustrated) that is connected to the drive shaft 410, the slider gear 450 is pushed by the locking pin 412 and the helical gears 452, 454 are moved in the axial direction of the drive shaft 410 at the same time.

The input arm 430 and the oscillation cams 440 that are spline-engaged with the helical gears 452, 454 are not moved in the axial direction when the helical gears 452, 454 are moved as described above. Accordingly, the input arm 430 and the oscillation cams 440 pivot around the axial center of the drive shaft 410 through helical spline engagement.

In this case, the helical splines that are formed in the input arm 430 and the oscillation cams 440 have opposite directions. Accordingly, the input arm 430 and the oscillation cams 440 have opposite pivoting directions. In this manner, the relative phase difference between the input arm 430 and the oscillation cam 440 is changed and the valve lift and the valve operating angle of the intake valve 118 are changed as described above.

For example, the VVL position sensor 311 illustrated in FIG. 2 is configured to have a mechanism that is capable of detecting a mechanical phase difference between the input arm 430 and the oscillation cam 440. Alternatively, the VVL position sensor 311 can also be configured to have a mechanism that is capable of detecting an axial-direction position of the drive shaft 410 which is moved by the actuator (not illustrated). The configuration of the VVL position sensor 311 is not particularly limited insofar as the valve lift and the valve operating angle, which are the operation characteristics of the intake valve 118, can be obtained directly or indirectly from the detection value of the VVL position sensor 311.

The controller 200 controls the valve lift and the valve operating angle of the intake valve 118 by adjusting an operation amount of the actuator that allows the drive shaft 410 to be in linear motion. An electric motor, for example, can constitute the actuator. In general, the electric motor that constitutes the actuator receives electric power supply from a battery (auxiliary battery) which is separate from the electric power storage device 10 in this case. Alternatively, the actuator can also be configured to be operated by hydraulic pressure that is generated by an oil pump which is driven by the engine 100.

The VVL device is not limited to the examples illustrated in FIGS. 4 and 5. For example, a VVL device that electrically drives a valve or drives a valve by using hydraulic pressure may also be used. In other words, the mechanism for changing the operation characteristics (valve lift and valve operating angle) of the intake valve 118 are not particularly limited in this embodiment, and known mechanisms can be applied if appropriate.

Figure 6:
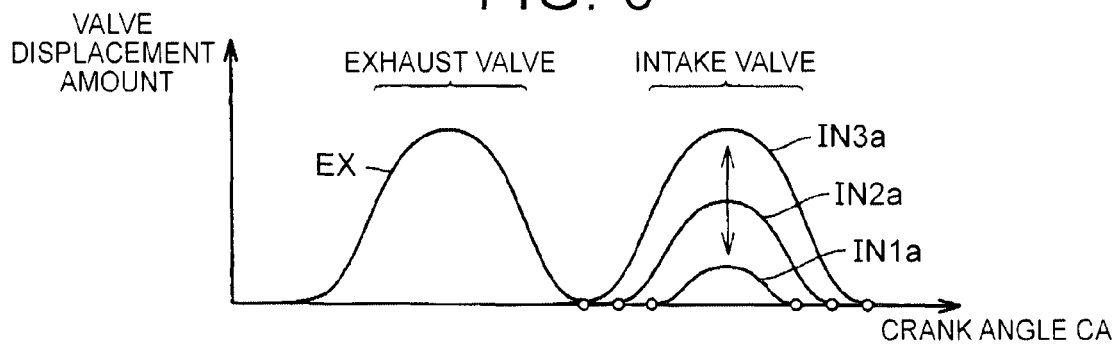
FIG. 6 is a diagram illustrating a valve displacement amount-crank angle relationship that is realized by a VVL device which is capable of switching an operation characteristic of an intake valve in three stages.

FIG. 6 is a diagram illustrating a valve displacement amount-crank angle relationship that is realized by the VVL device 400 which is capable of switching the operation characteristic of the intake valve 118 in three stages.

Referring to FIG. 6, the VVL device 400 can switch the operation characteristic of the intake valve 118 to any one of a first characteristic to a third characteristic. A waveform IN1a shows the first characteristic. A waveform IN2a shows the second characteristic, in which the valve lift and the valve operating angle are larger than when the operation characteristic is the first characteristic. A waveform IN3a shows the third characteristic, in which the valve lift and the valve operating angle are larger than when the operation characteristic is the second characteristic.

Hereinafter, the first characteristic (waveform IN1a) in which the valve lift and the valve operating angle are relatively smaller than in the other two will be referred to as a "small cam characteristic" and the third characteristic (waveform IN3a) in which the valve lift and the valve operating angle are relatively larger than in the other two will be referred to as a "large cam characteristic". In addition, the second characteristic (waveform IN2a) in which the valve lift and the valve operating angle are larger than in the small cam characteristic and smaller than in the large cam characteristic will be referred to as a "medium cam characteristic".

Figure 7:
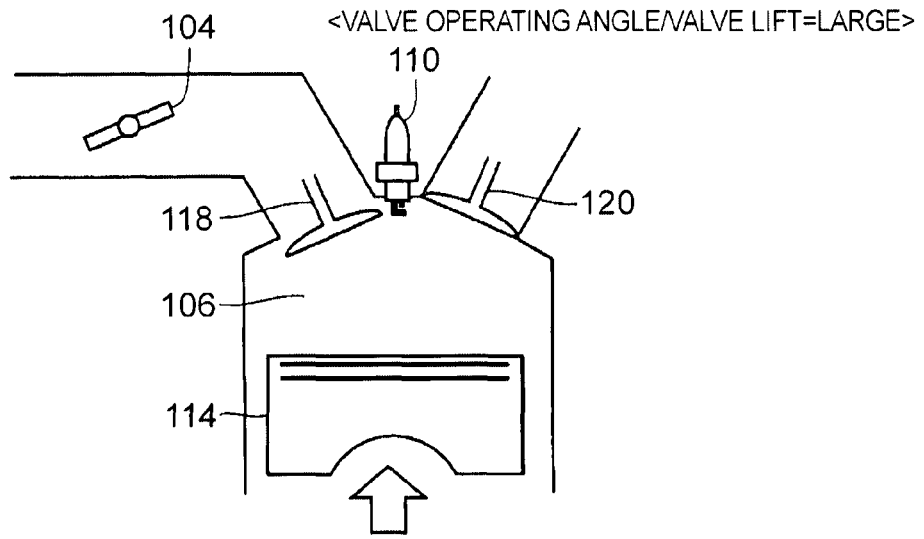
FIG. 7 is a conceptual diagram for showing an operation during piston rise at a time when a valve lift and a valve operating angle of the intake valve are large.

FIG. 7 is a diagram for showing an operation during piston rise at a time when the operation characteristic of the intake valve 118 is the large cam characteristic.

Referring to FIG. 7, the timing at which the intake valve 118 is closed during the rise of the piston 114 is delayed in a case where the operation characteristic of the intake valve 118 is the large cam characteristic. Accordingly, the engine 100 is operated by the Atkinson cycle and the fuel economy can be improved. In the intake stroke, a part of the air intake into the cylinder 106 is returned out of the cylinder 106, and thus a compression ratio of the air-fuel mixture in the cylinder 106 is reduced and ignitability of the air-fuel mixture is deteriorated. Then, a combustion state of the air-fuel mixture tends to deteriorate and the emission in the exhaust gas is deteriorated. Because a compression reaction force in a compression stroke is reduced, vibration resulting from engine start can be reduced when application is made to the engine start.

Figure 8:
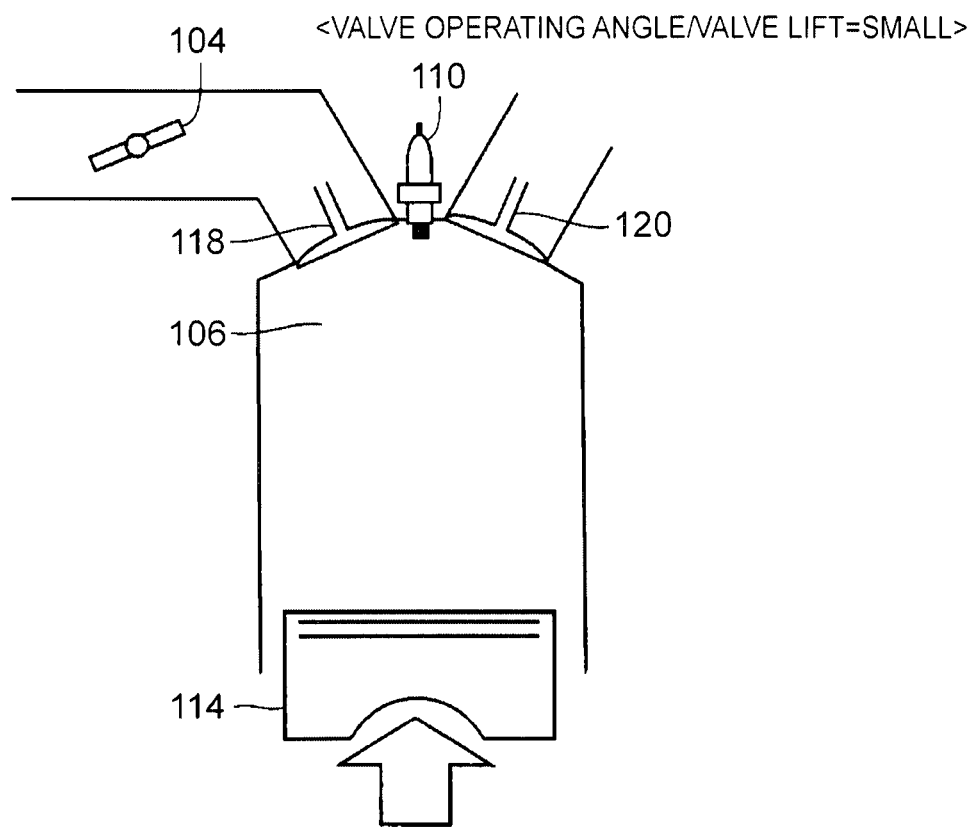
FIG. 8 is a conceptual diagram for showing an operation during piston rise at a time when the valve lift and the valve operating angle of the intake valve are small.
Figure 9:
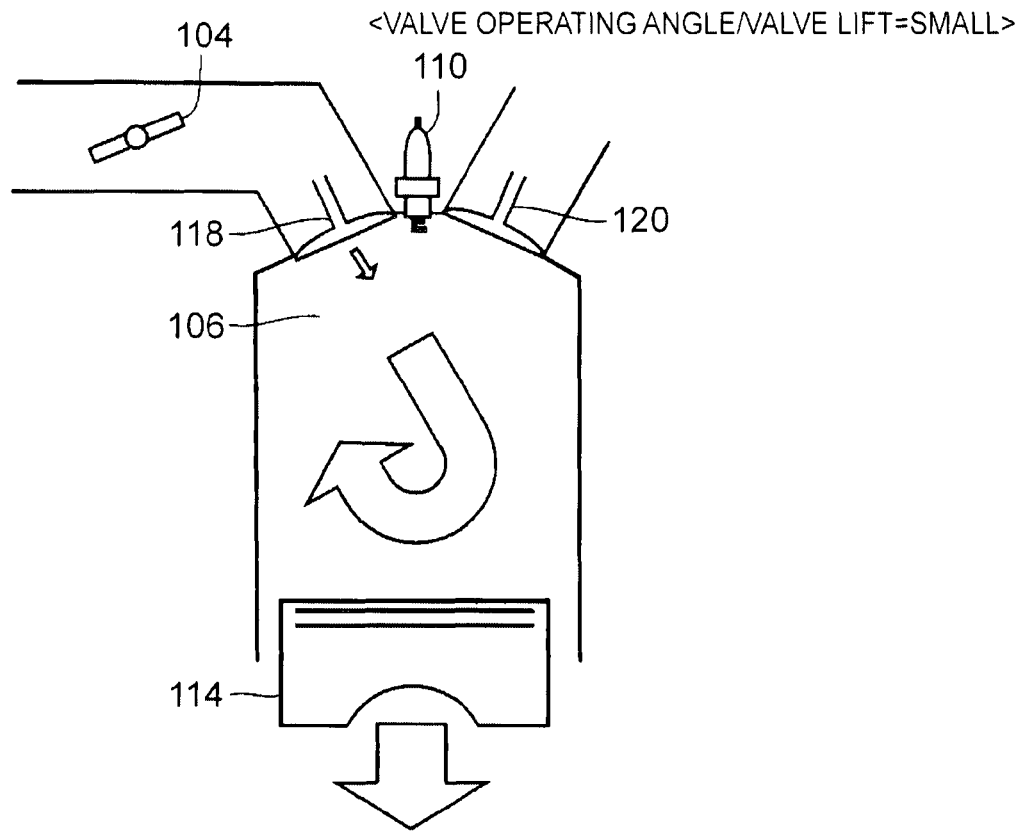
FIG. 9 is a conceptual diagram for showing an operation during piston lowering at a time when the valve lift and the valve operating angle of the intake valve are small.

FIG. 8 is a diagram for showing an operation during piston rise at a time when the operation characteristic of the intake valve 118 is the small cam characteristic. FIG. 9 is a diagram for showing an operation during piston lowering at a time when the operation characteristic of the intake valve 118 is the small cam characteristic.

Referring to FIGS. 8 and 9, the timing at which the intake valve 118 is opened during the lowering of the piston 114 is delayed in a case where the operation characteristic of the intake valve 118 is the small cam characteristic. Accordingly, the air-fuel mixture is taken in from the intake port in a state where a negative pressure is generated in the cylinder 106, and the mixing of the fuel in the cylinder 106 is accelerated. In addition, the timing at which the intake valve 118 is closed during the rise of the piston 114 is advanced, and thus the compression ratio of the air-fuel mixture in the cylinder 106 rises and the ignitability of the air-fuel mixture is improved. Accordingly, the combustion state of the air-fuel mixture is improved and the emission in the exhaust gas is improved. Due to a large pumping loss, however, the fuel economy is relatively deteriorated.

If the small cam characteristic is applied to the engine start, the vibration increases compared to the case of the large cam characteristic but the ignitability is better and thus the startability during engine cooling can be increased. If the large cam characteristic is applied to the engine start, the vibration during the engine start can be suppressed compared to the case of the small cam characteristic whereas the startability may drop during the engine cooling.

Figure 10:
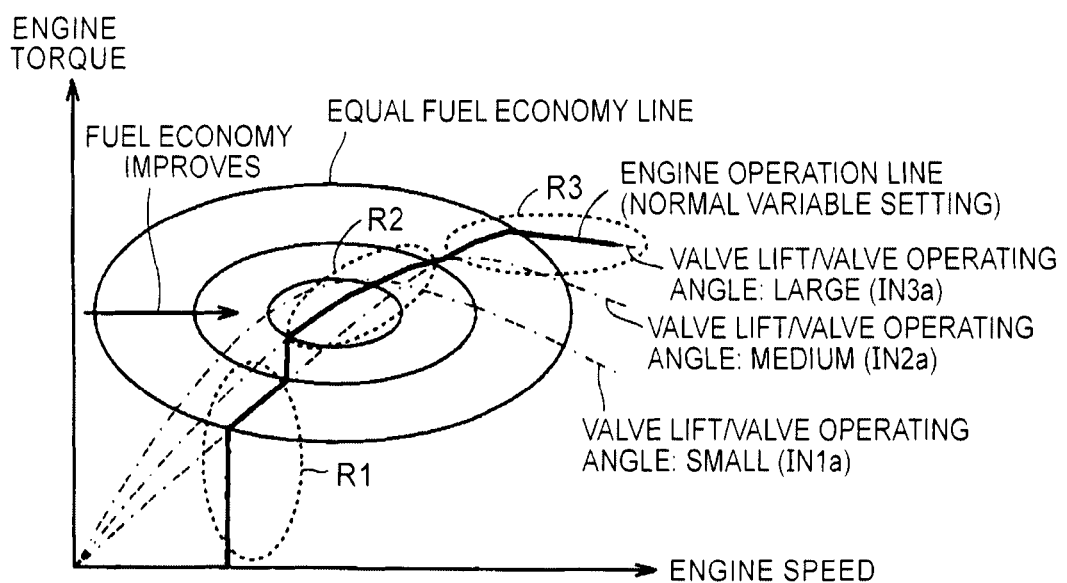
FIG. 10 is a conceptual diagram for showing an engine output characteristic at a time when the operation characteristics (valve lift and valve operating angle) of the intake valve are changed.

FIG. 10 is a conceptual diagram for showing an engine output characteristic at a time when the operation characteristics (valve lift and valve operating angle) of the intake valve 118 are changed.

Referring to FIG. 10, the horizontal axis shows the engine speed and the vertical axis shows the engine torque. The lines illustrated by the one-dot chain lines represent torque characteristics corresponding to the first to third characteristics (IN1a to IN3a). The circles illustrated by the solid lines represent equal fuel economy lines, and the fuel economy is higher toward the center of the circle.

Schematically, a larger engine torque can be output as the valve lift and the valve operating angle decrease in a low-speed range of the engine 100. In a high-speed range of the engine 100, a larger engine torque can be output as the valve lift and the valve operating angle increase. In addition, the engine 100 has the best fuel economy when the medium cam characteristic is applied in a mid-speed range. During normal control after the completion of the catalyst warm-up control, the engine 100 is operated basically on an engine operation line that is determined in advance in view of the above-described characteristics. This engine operation line is illustrated by the solid line in FIG. 10.

According to the engine operation line, engine vibration suppression is important in the low-speed range that is illustrated as an area R1. In this low-speed range, the EGR valve 142 (FIG. 2) is closed so that EGR gas introduction is stopped, and the fuel economy can be improved by the Atkinson cycle. Accordingly, in the area R1, the third characteristic (IN3a: large cam characteristic) is selected as the operation characteristic of the intake valve 118 so that the valve lift and the valve operating angle increase.

In the mid-speed range that is illustrated as an area R2, the EGR valve 142 (FIG. 2) is opened and an EGR gas introduction amount increases, and thus the fuel economy can be improved. Accordingly, in the area R2, the second characteristic (medium cam characteristic) is selected as the operation characteristic of the intake valve 118 so that the valve lift and the valve operating angle are at medium levels.

In other words, the fuel efficiency improvement by the Atkinson cycle is given priority over the fuel efficiency improvement by the EGR gas introduction in a case where the valve lift and the valve operating angle of the intake valve 118 are large (large cam characteristic). In a case where the medium valve lift and the medium valve operating angle are selected (medium cam characteristic), the fuel efficiency improvement by the EGR gas introduction is given priority over the fuel efficiency improvement by the Atkinson cycle.

In the high-speed range that is illustrated as an area R3, a large amount of air is introduced into the cylinder by intake inertia and an output performance can be improved by a rise in actual compression ratio. Accordingly, in the area R3, the third characteristic (large cam) is selected as the operation characteristic of the intake valve 118 so that the valve lift and the valve operating angle increase. In this manner, the valve lift and the valve operating angle are determined in accordance with the operation state (operation point) of the engine 100 during the normal control during the traveling.

Referring back to FIGS. 1 and 2, the hybrid vehicle 1 is capable of traveling by using the motor generators MG (EV traveling) with the engine 100 stopped. In other words, the engine 100 is intermittently operated in the hybrid vehicle 1. Engine start processing is executed when, for example, a predetermined engine start condition is satisfied in the engine stop state. Representatively, the engine start condition is satisfied when an output required for the hybrid vehicle 1 exceeds a predetermined threshold. In contrast, an engine stop condition is satisfied and engine stop processing is executed if the output required for the hybrid vehicle 1 drops during the operation of the engine 100.

The engine start condition is also satisfied in a case where a predetermined catalyst warm-up execution condition that is required for warm-up of the S/C catalyst 112S (FIG. 2) which is disposed in the exhaust passage is satisfied. When the catalyst warm-up execution condition is satisfied, the controller 200 executes the catalyst warm-up control for operating the engine 100 in a state other than the normal control. The catalyst warm-up execution condition is executed based on, for example, the temperature of the S/C catalyst 112S (hereinafter, catalyst temperature). The catalyst temperature can be estimated based on the operation of the engine 100 as described later.

The catalyst temperature drops when the engine is stopped, and thus the catalyst warm-up execution condition is satisfied in the engine stop state. However, the engine 100 is not limited to being in a cold state when the catalyst warm-up execution condition is satisfied, and the catalyst warm-up execution condition may also be satisfied when the engine 100 is in a warm state as the case may be. This is because of arrangement location and heat capacity differences between the S/C catalyst 112S and a main body part of the engine 100. Usually, the S/C catalyst 112S is arranged in a situation in which the S/C catalyst 112S is exposed to outside air and has a relatively small heat capacity, and thus the catalyst temperature drop during the engine stop exceeds a drop in the coolant temperature Tw of the engine 100. As a result, depending on outside air conditions, the catalyst warm-up execution condition may be satisfied due to the catalyst temperature drop even though the coolant temperature Tw of the engine 100 is not dropped to a significant extent.

Figure 11:
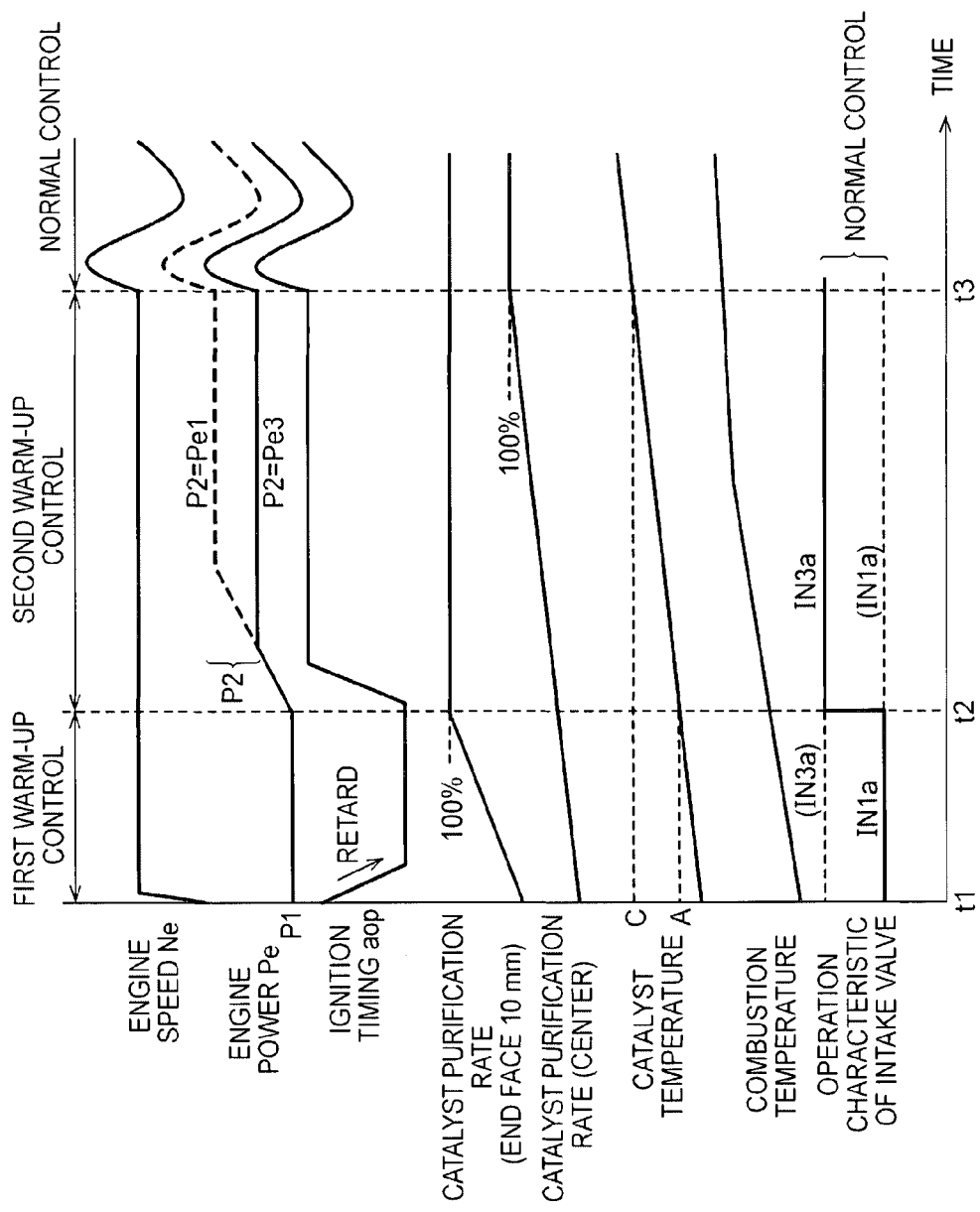
FIG. 11 is an operation waveform diagram for showing engine control during catalyst warm-up control in the hybrid vehicle according to the first embodiment of the invention.

FIG. 11 is an operation waveform diagram for showing engine control during the catalyst warm-up control.

Referring to FIG. 11, the horizontal axis shows time, and waveforms showing engine speed Ne, engine power Pe, ignition timing aop of the engine 100, a purification rate in an exhaust upstream side end portion (for example, end face 10 mm position) of the S/C catalyst 112S, a purification rate at the center of the S/C catalyst 112S, a combustion temperature of the engine 100, and a setting state for the operation characteristic of the intake valve 118 are shown in order from the top of the vertical axis.

The purification rate is defined as a ratio of the emission concentration of the output exhaust gas to the emission concentration (representatively, HC concentration) of the input exhaust gas. In actuality, the purification rate is estimated based on the catalyst temperature by using a previously prepared map, a relational expression, and the like. The catalyst temperature is estimated from the amount of air intake into the engine 100 and an ignition retard amount by using a previously prepared map, a relational expression, and the like.

The catalyst purification rate (end face 10 mm), which is the purification rate in the exhaust upstream side end portion of the S/C catalyst 112S, shows the purification rate at the exhaust upstream side end face 10 mm as an example and will be referred to as an "end face purification rate" in the following description. In addition, the catalyst purification rate (center) shows the purification rate in the entire S/C catalyst 112S and will be referred to as a "central purification rate" in the following description.

When the warm-up execution condition of the S/C catalyst 112S is satisfied at time t1, the engine 100 is started for warm-up of the S/C catalyst 112S and the catalyst warm-up control is initiated.

The controller 200 executes the catalyst warm-up control after dividing the catalyst warm-up control into two stages, one being first warm-up control for warming up the exhaust upstream side of the S/C catalyst 112S first and the other being second warm-up control. The first warm-up control is executed immediately after the engine 100 is started. In other words, the first warm-up control is executed from time t1.

During the first warm-up control, the controller 200 sets the engine speed Ne to a constant value corresponding to an idling speed and then operates the engine 100 so that the engine output (engine power Pe) becomes first operating power P1 (for example, low power of approximately 0 to 3 kW). The first operating power P1 does not respond to traveling power, and the traveling power of the hybrid vehicle 1 is output from the motor generator MG2.

In addition, the controller 200 controls the ignition timing aop of the engine 100 to a retard side during the first warm-up control so as to increase a temperature of combustion gas (exhaust gas). This is to increase the temperature of the exhaust gas and warm up the S/C catalyst 112S early by controlling the ignition timing to the retard side while suppressing the power of the engine 100 to suppress the amount of the exhaust gas.

The first warm-up control causes the catalyst temperature to rise. In response, the end face purification rate and the central purification rate of the S/C catalyst 112S rise. The first warm-up control continues until the end face purification rate of the S/C catalyst 112S reaches 100%.

The controller 200 executes the second warm-up control after the exhaust upstream side of the S/C catalyst 112S is warmed up by the first warm-up control and a minimum exhaust purification capacity is ensured. Accordingly, the first warm-up control is terminated and the second warm-up control is initiated when the end face purification rate of the S/C catalyst 112S reaches 100% at time t2.

During the second warm-up control, the controller 200 returns the ignition timing aop of the engine 100 controlled to the retard side to a normal state and operates the engine 100 so that the engine output becomes larger than during the first warm-up control. For example, during the second warm-up control, the engine power Pe becomes second operating power P2 (Pe=P2) that is larger than the first operating power P1 for the first warm-up control. The second operating power P2 does not respond to the traveling power, and is set not to exceed the exhaust purification capacity of the S/C catalyst 112S. Even during the second warm-up control, the traveling power of the hybrid vehicle 1 is output from the motor generator MG2. Since the engine power Pe is stably controlled regardless of the traveling power, the warm-up of the S/C catalyst 112S continues in a state where the operation of the engine 100 is stabilized.

The second warm-up control is terminated when the exhaust purification capacity of the S/C catalyst 112S reaches 100% at time t3. As a result, the catalyst warm-up control is also terminated and the normal control for operating the engine 100 so that an output based on the traveling power is generated is applied to the engine 100. During the normal control, traveling (HV traveling) for driving the motor generator MG2 and the engine 100 based on the traveling power is performed, the power demand for the engine 100 is set, and the engine output is controlled so that the engine power Pe is controlled in accordance with the engine power demand. For example, the operation of the engine 100 including the operation characteristic of the intake valve 118 is controlled in accordance with the engine operation line that is illustrated in FIG. 10.

Next, the operation characteristic of the intake valve 118 during the catalyst warm-up control will be described. As described above, the engine 100 can be in any of the cold state and the warm state when the catalyst warm-up control is initiated. In general, whether the engine 100 is in the cold state or in the warm state is determined based on the coolant temperature Tw (FIG. 2).

The solid line in FIG. 11 represents control of the intake valve 118 during the catalyst warm-up control in the engine cold state and the dotted line in FIG. 11 represents control of the intake valve 118 during the catalyst warm-up control in the engine warm state.

In the engine cold state, the ignition timing aop is controlled to the retard side and the combustion state of the engine 100 is unstable during the first warm-up control immediately after the engine start. Accordingly, from time t1 to t2, the operation characteristic of the intake valve 118 is set to the small cam characteristic (IN1a in FIG. 6), with priority given to improving the combustion state of the air-fuel mixture, as illustrated in FIG. 9. In this manner, the emission in the exhaust gas during the first warm-up control can also be suppressed. Preferably, the operation characteristic of the intake valve 118 is set to the large cam characteristic (IN3a in FIG. 6) after the combustion state in the engine 100 is stabilized. This is because the fuel economy can be improved when the engine 100 is operated by the Atkinson cycle.

Accordingly, the operation characteristic of the intake valve 118 is set to the small cam characteristic (IN1a in FIG. 6) during the first warm-up control (time t1 to t2) and is set to the large cam characteristic (IN3a in FIG. 6) during the second warm-up control (time t2 to t3) in the catalyst warm-up control in the engine cold state. The operation characteristic of the intake valve 118 may be changed to the large cam characteristic (IN3a in FIG. 6) after providing a period in which the operation characteristic of the intake valve 118 is set to the medium cam characteristic (IN2a in FIG. 6) during the second warm-up control.

In the engine warm state, the combustion state of the engine 100 is relatively good even if the ignition timing aop is controlled to be on the retard side. Accordingly, as illustrated in FIG. 7, the operation characteristic of the intake valve 118 is set to the large cam characteristic (IN3a) during the first warm-up control with priority given to suppressing the vibration resulting from the engine start.

When the operation characteristic of the intake valve 118 is the large cam characteristic (IN3a), the emission in the exhaust gas is deteriorated as illustrated in FIG. 7. Accordingly, it is not preferable to maintain the operation characteristic of the intake valve 118 at the large cam characteristic (IN3a) throughout the catalyst warm-up control, and thus it is preferable that the operation characteristic of the intake valve 118 is changed for emission suppression during the second warm-up control (time t2 to t3).

As a result, the operation characteristic of the intake valve 118 is set to the large cam characteristic (IN3a in FIG. 6) during the first warm-up control (time t1 to t2) and is set to the small cam characteristic (IN1a in FIG. 6) during the second warm-up control (time t2 to t3) in the catalyst warm-up control in the engine warm state. The operation characteristic of the intake valve 118 can also be changed to the small cam characteristic (IN1a in FIG. 6) after providing a period in which the operation characteristic of the intake valve 118 is set to the medium cam characteristic (IN2a in FIG. 6) during the second warm-up control.

As described above, the engine output (engine power Pe) during the second warm-up control does not respond to the traveling power but is set to a value that does not exceed the exhaust purification capacity of the S/C catalyst 112S. However, the emission or the fuel economy of the engine 100 may be deteriorated during the second warm-up control unless the second operating power P2 is harmonious with the operation characteristic of the intake valve 118.

Referring back to FIG. 10, the engine speed during the catalyst warm-up control corresponds to the idle speed and corresponds to the area R1. Accordingly, in the speed range (low-speed range) for the catalyst warm-up control, the engine output can be increased by decreasing the valve lift and the valve operating angle. Accordingly, in an area where the valve lift and the valve operating angle are small, the fuel economy of the engine 100 can be increased by setting a high second operating power P2. In other words, the fuel economy may be deteriorated if the second operating power P2 is excessively low with the operation characteristic of the intake valve 118 being the small cam characteristic.

Figure 12:
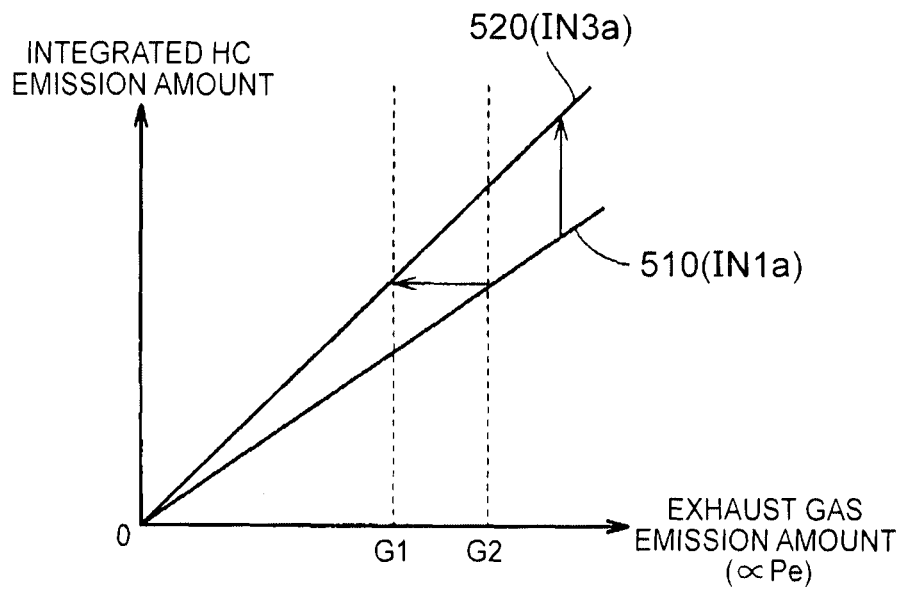
FIG. 12 is a conceptual graph for showing a characteristic relationship between an exhaust gas emission amount and an integrated HC emission amount corresponding to the operation characteristic of the intake valve.

FIG. 12 illustrates characteristic relationship between an exhaust gas emission amount and an integrated HC emission amount corresponding to the operation characteristic of the intake valve 118.

Referring to FIG. 12, the exhaust gas emission amount from the engine 100 that is illustrated by the horizontal axis is proportional to the engine power Pe. In addition, the vertical axis shows the integrated HC emission amount. The relationship between the exhaust gas emission amount and the integrated HC emission amount at a time when the intake valve 118 has the small cam characteristic (IN1a) is shown by a characteristic line 510. Likewise, a characteristic line 520 shows the relationship between the exhaust gas emission amount and the integrated HC emission amount at a time when the intake valve 118 has the large cam characteristic (IN3a).

As is apparent from the characteristic lines 510, 520, the integrated HC emission amount is proportional to the exhaust gas emission amount. The proportionality coefficient increases as the valve lift and the valve operating angle of the intake valve 118 increase.

Accordingly, the exhaust gas emission amount (G1) at a time when the intake valve 118 has the large cam characteristic (IN3a) needs to be smaller than the exhaust gas emission amount (G2) at a time when the intake valve 118 has the small cam characteristic (IN1a) if the integrated HC emission amount during the second warm-up control is to become equal between a time when the operation characteristic of the intake valve 118 is the large cam characteristic (IN3a) and a time when the operation characteristic of the intake valve 118 is the small cam characteristic (IN1a).

In other words, the integrated HC emission amount during the second warm-up control increases if the engine power Pe (second operating power P2) is excessively high with the intake valve 118 having the large cam characteristic (IN3a).

Figure 13:
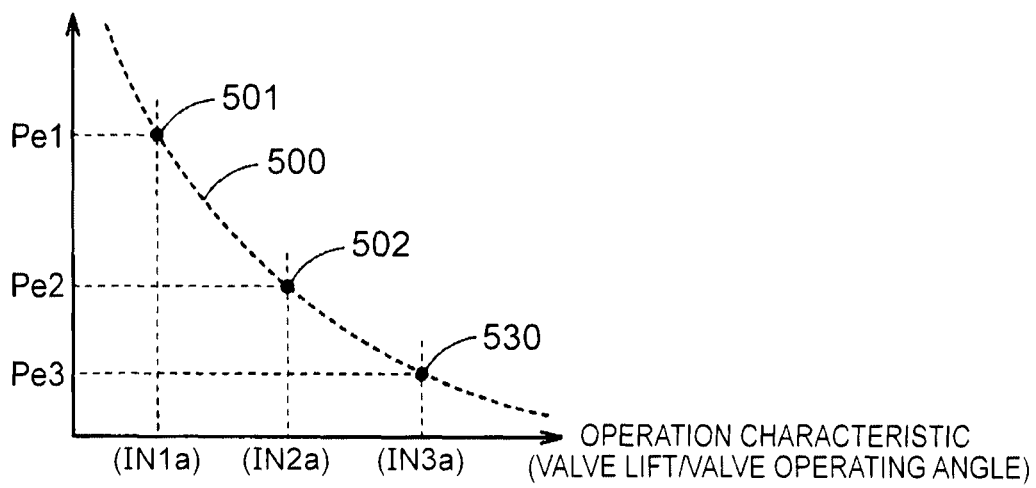
FIG. 13 is a conceptual diagram for showing a characteristic relationship between the operation characteristic of the intake valve and an engine output during second warm-up control.

Accordingly, in the hybrid vehicle according to this embodiment, the engine output (second operating power P2) during the second warm-up control in the catalyst warm-up control is set in conjunction with the operation characteristic of the intake valve 118 as illustrated in FIG. 13.

Referring to FIG. 13, a correspondence relationship is set between the second operating power P2 during the second warm-up control and the operation characteristic (valve lift and valve operating angle) of the intake valve 118. For example, in the VVL device 400 that is capable of setting the operation characteristic of the intake valve 118 in three stages, characteristic points 501 to 503 for engine output (second operating power P2) correspondence are determined depending on the small cam characteristic (IN1a), the medium cam characteristic (IN2a), and the large cam characteristic (IN3a), respectively.

For example, according to the characteristic point 501, P2 is set to be equal to Pe1 when the operation characteristic of the intake valve 118 is the small cam characteristic (IN1a). According to the characteristic point 502, P2 is set to be equal to Pet when the operation characteristic of the intake valve 118 is the medium cam characteristic (IN2a). According to the characteristic point 503, P2 is set to be equal to Pe3 when the operation characteristic of the intake valve 118 is the large cam characteristic (IN3a).

Regarding Pe1 to Pe3, a relationship of Pe1>Pe2>Pe3 is satisfied. In other words, the second operating power P2 during the second warm-up control is set so that the engine output (engine power Pe) decreases as the valve lift and the valve operating angle of the intake valve 118 during the second warm-up control increase.

In the engine 100, the characteristic points 501 to 503 can be determined in advance through, for example, an actual experiment at each of the operation characteristics of the intake valve 118. In addition, a characteristic line 500 for engine output (second operating power P2) correspondence to continuous changes in the valve lift and the valve operating angle of the intake valve 118 can also be obtained by interpolation and extrapolation of the characteristic points 501 to 503.

Figure 14:
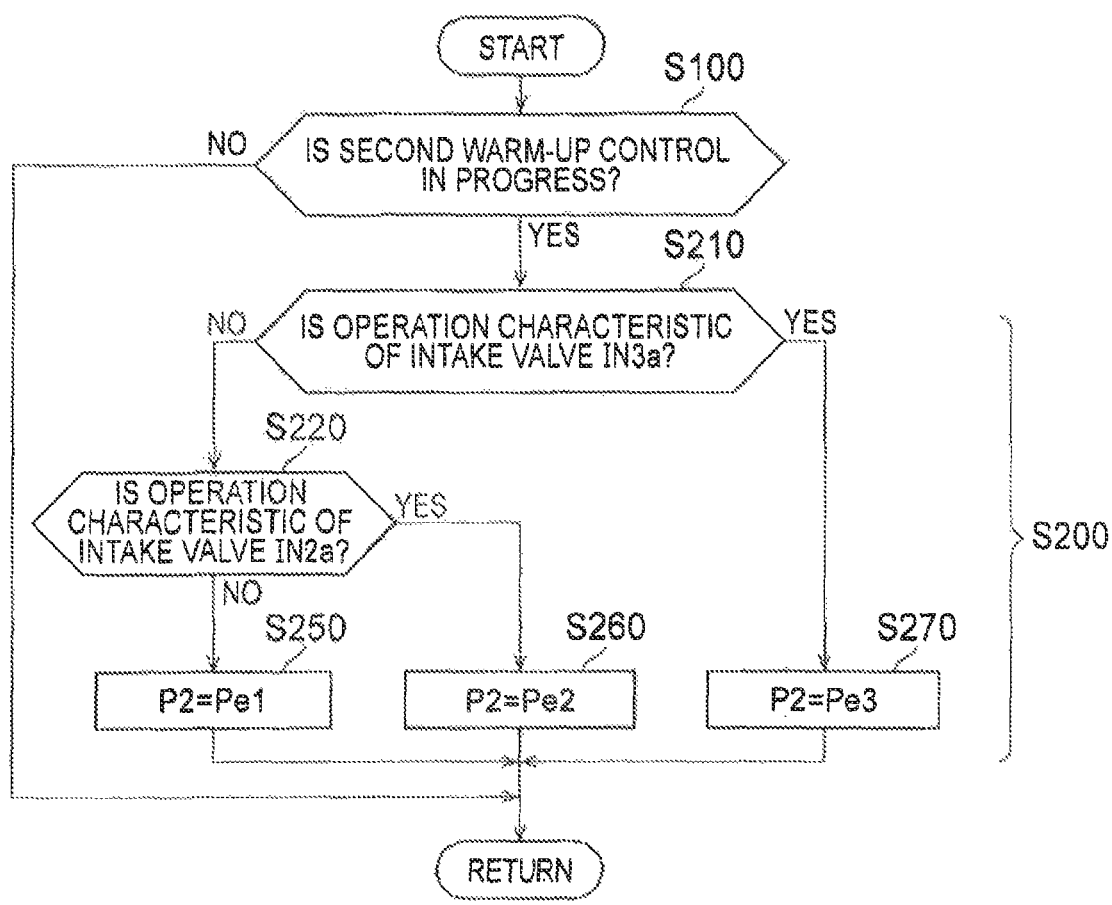
FIG. 14 is a flowchart showing engine output setting during the second warm-up control in the catalyst warm-up control in the hybrid vehicle according to the first embodiment of the invention.

FIG. 14 is a flowchart showing engine output setting during the second warm-up control in the catalyst warm-up control in the hybrid vehicle according to the first embodiment of the invention. The control processing that is illustrated in FIG. 14 is repeatedly executed for each predetermined control period by the controller 200 during the execution of the catalyst warm-up control.

Referring to FIG. 14, the controller 200 determines in Step S100 whether or not the second warm-up control is in progress. In the example of FIG. 11, a YES determination is made for time t1 to t2 in Step S100.

When the second warm-up control is being executed (YES determination in S100), the controller 200 sets the second operating power P2 depending on the operation characteristic of the intake valve in Step S200. Step S200 has the following Steps S210, S220, and S250 to S270.

In Steps S210 and S220, the controller 200 distinguishes whether the present operation characteristic of the intake valve 118 is the small cam characteristic (IN1a), the medium cam characteristic (IN2a), or the large cam characteristic (IN3a). Specifically, it is determined whether or not the operation characteristic of the intake valve 118 is the large cam characteristic (IN3a) in Step S210 and it is determined whether or not the operation characteristic of the intake valve 118 is the medium cam characteristic (IN2a) in Step S220. The determinations in Steps S210 and 220 can be executed based on the detection value Lv from the VVL position sensor 311 (FIG. 2).

When the operation characteristic of the intake valve 118 is the large cam characteristic (IN3a) (YES determination in S210), the controller 200 allows the processing to proceed to Step S270. In addition, the controller 200 allows the processing to proceed to Step S260 when the operation characteristic of the intake valve 118 is the medium cam characteristic (IN2a) (NO determination in S210 and YES determination in S220). In addition, when the operation characteristic of the intake valve 118 is the small cam characteristic (IN1a) (NO determination in S210 and NO determination in S220), the controller 200 allows the processing to proceed to Step S250.

In Step S250, the controller 200 sets P2 to be equal to Pe1 according to the characteristic point 501 in FIG. 13. Likewise, the controller 200 sets P2 to be equal to Pe2 in Step S260 according to the characteristic point 502 in FIG. 13. In addition, the controller 200 sets P2 to be equal to Pe3 in Step S270 according to the characteristic point 503 in FIG. 13.

When the second warm-up control is not being executed (NO determination value in S100), the controller 200 does not execute the processing of S200.

Referring back to FIG. 11, the engine output (second operating power P2) during the second warm-up control (time t2 to t3) is set in conjunction with the present operation characteristic of the intake valve 118 according to the characteristic relationship illustrated in FIG. 13. As a result, the engine output (second operating power P2) can be appropriately set depending on the operation characteristic of the intake valve 118 with the operation characteristic of the intake valve 118 during the second warm-up control set appropriate in accordance with the situation of the engine 100. As a result, emission and fuel economy deteriorations attributable to the lack of harmony between the engine output and the operation characteristic of the intake valve 118 can be prevented during the second warm-up control.

According to the control processing that is illustrated in FIG. 14, the engine output (second operating power P2) can be appropriately set even in a case where the change in the operation characteristic of the intake valve 118 by the VVL device 400 is limited during the second warm-up control. The change in the operation characteristic of the intake valve 118 is limited when, for example, a response speed during the change in the operation characteristic (valve lift and valve operating angle) of the intake valve by the VVL device 400 is dropped due to a temporary presence of a foreign matter, fixation at a very low temperature, and the like or the VVL device 400 malfunctions.

Figure 15:
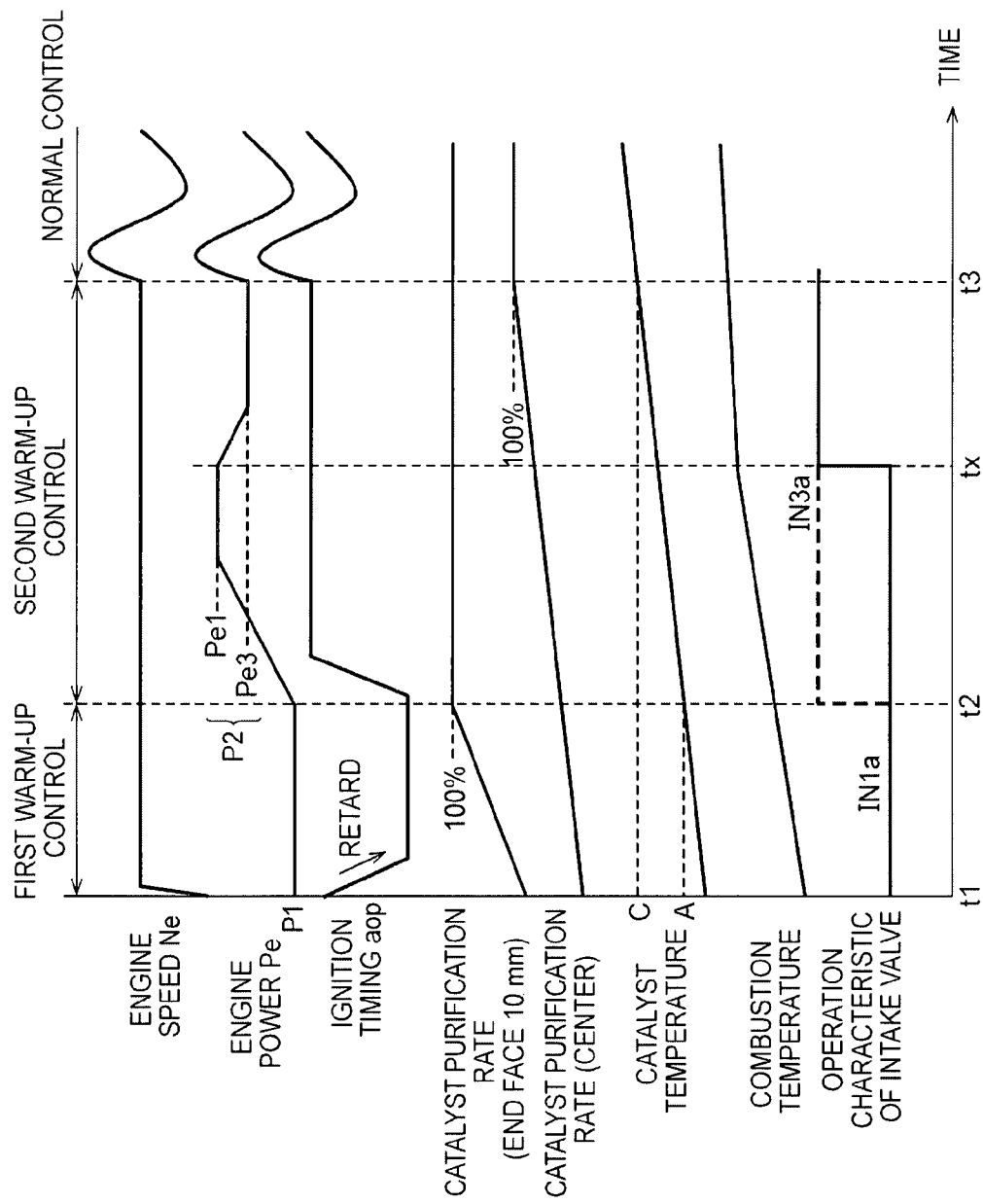
FIG. 15 is a first operation waveform diagram of the catalyst warm-up control at a time when the operation characteristic of the intake valve is limited.
Figure 16:
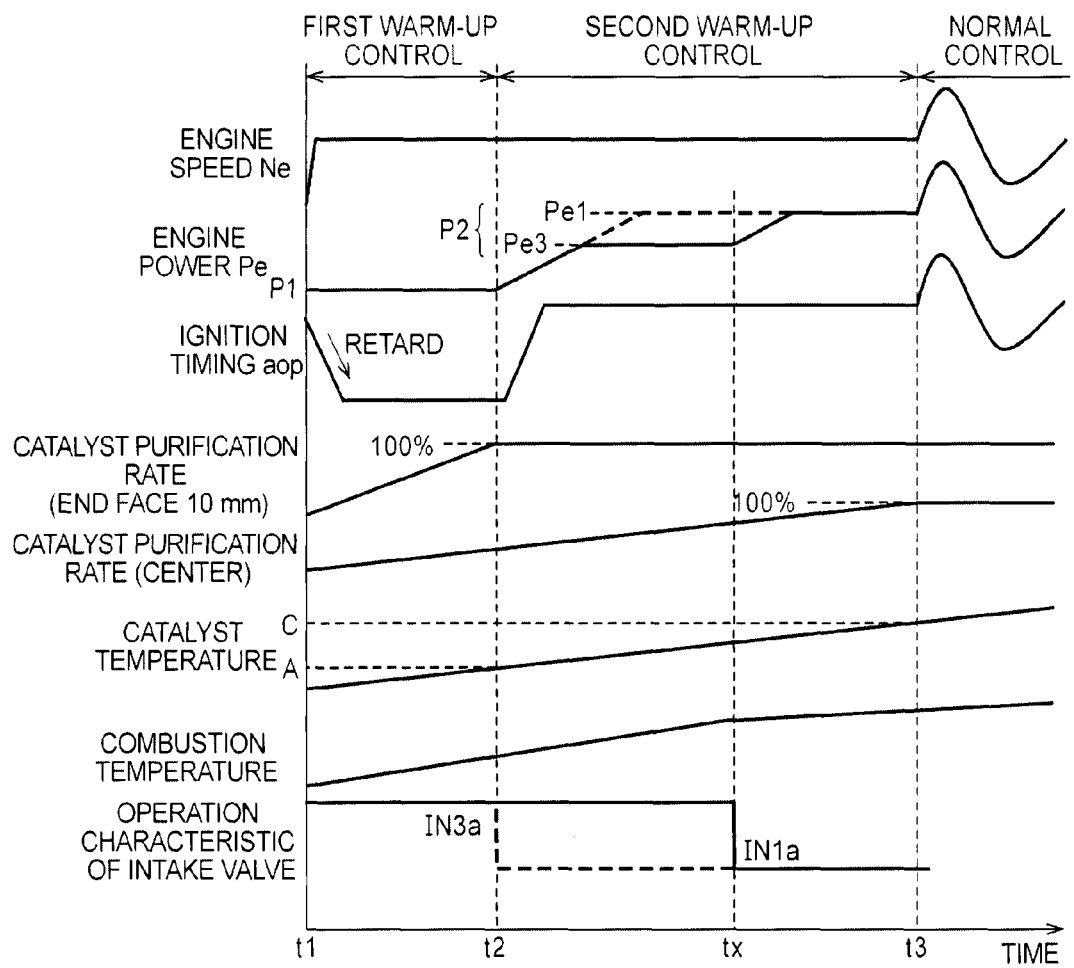
FIG. 16 is a second operation waveform diagram of the catalyst warm-up control at a time when the operation characteristic of the intake valve is limited.

FIGS. 15 and 16 are operation waveform diagrams of the catalyst warm-up control at a time when the change in the operation characteristic of the intake valve is limited. FIG. 15 illustrates an operation waveform diagram at a time when the operation characteristic of the intake valve is limited during the control of the operation characteristic of the intake valve 118 illustrated by the solid line in FIG. 11.

Referring to FIG. 15, the VVL device 400 controls the operation characteristic of the intake valve 118 to the small cam characteristic (IN1a) during the first warm-up control (time t1 to t2) and controls the operation characteristic of the intake valve 118 to the large cam characteristic (IN3a) during the second warm-up control (time t2 to t3) in the engine cold state as illustrated in FIG. 11.

When the control by the VVL device 400 is normal, the operation characteristic of the intake valve 118 is controlled to the large cam characteristic (IN3a) at time t2, when the second warm-up control is initiated, as illustrated by the dotted line in FIG. 15. In response, the engine output (second operating power P2) during the second warm-up control is changed toward Pe3 in accordance with the characteristic point 503.

The solid line in FIG. 15 shows an operation in a case where the control of the operation characteristic of the intake valve 118 by the VVL device 400 is limited. The operation characteristic of the intake valve 118 is changed from the small cam characteristic (IN1a) to the large cam characteristic (IN3a) at time tx, which is delayed from time t2, due to the fixation in the VVL device 400 or the like.

In this case, the engine output (second operating power P2) during the second warm-up control is set depending on a current value of the operation characteristic of the intake valve 118 based on the output of the VVL position sensor 311. Accordingly, P2 in a period until time tx is set to Pe1 (Pe1>Pe3) instead of Pe3.

In this manner, P2 is set to be equal to Pe3 depending on the large cam characteristic (IN3a), which is a control target, although the actual operation characteristic of the intake valve 118 is the small cam characteristic (IN1a), and thus the deterioration in the fuel economy in the low-speed range that is illustrated in FIG. 10 can be prevented. In other words, the fuel economy can be improved by setting P2 to be equal to Pe1 with the engine output (second operating power P2) until time tx being allowed depending on the small cam characteristic (IN1a) that is the actual operation characteristic.

FIG. 16 illustrates an operation waveform diagram at a time when the operation characteristic of the intake valve is limited during the control (engine warm state) of the operation characteristic of the intake valve 118 that is illustrated by the dotted line in FIG. 11.

Referring to FIG. 16, the VVL device 400 controls the operation characteristic of the intake valve 118 to the large cam characteristic (IN3a) during the first warm-up control (time t1 to t2) and controls the operation characteristic of the intake valve 118 to the small cam characteristic (IN1a) during the second warm-up control (time t2 to t3) in, for example, the engine warm state as illustrated in FIG. 11.

When the control by the VVL device 400 is normal, the operation characteristic of the intake valve 118 is controlled to the small cam characteristic (IN1a) at time t2, when the second warm-up control is initiated, as illustrated by the dotted line in FIG. 16. In response, the engine output (second operating power P2) during the second warm-up control is changed toward Pe1 in accordance with the characteristic point 501.

The solid line in FIG. 16 shows an operation in a case where the control of the operation characteristic of the intake valve 118 by the VVL device 400 is limited. The operation characteristic of the intake valve 118 is changed from the large cam characteristic (IN3a) to the small cam characteristic (IN1a) at time tx, which is delayed from time t2, due to the temporary presence of the foreign matter in the VVL device 400 or the like.

In this case, the engine output (second operating power P2) during the second warm-up control is set to Pe3 (Pe3<Pe1), instead of Pe1, in a period until time tx based on the current value of the operation characteristic of the intake valve 118.

In this case, the integrated HC emission amount increases and the emission is deteriorated as illustrated in FIG. 12 if the engine output (second operating power P2) is set to be equal to Pe1 depending on the small cam characteristic (IN1a), which is a control target, even though the actual operation characteristic of the intake valve 118 is the large cam characteristic (IN3a).

In other words, the deterioration in the emission can be prevented by setting P2 to be equal to Pe3 with the engine output (second operating power P2) until time tx being allowed depending on the large cam characteristic (IN3a) that is the actual operation characteristic.

As described above, according to the catalyst warm-up control in the hybrid vehicle according to this first embodiment, the engine output during the second warm-up control with a returned ignition timing can be appropriately set depending on the operation characteristic of the intake valve 118 after the first warm-up control with a retarded ignition timing. In this manner, the emission or fuel economy deterioration attributable to the lack of harmony between the engine output and the operation characteristic of the intake valve can be prevented during the catalyst warm-up control (during the second warm-up control in particular). Accordingly, the emission and the fuel economy can be improved during the catalyst warm-up control.

In addition, as illustrated in FIGS. 15 and 16, the emission or fuel economy deterioration during the second warm-up control can be prevented, even in a case where the change in the operation characteristic of the intake valve 118 by the VVL device 400 is limited, by changing the engine output (second operating power P2) depending on the change in the operation characteristic during the second warm-up control depending on the current detection value of the operation characteristic of the intake valve 118.

[Modification Example of VVL Device]

In the first embodiment described above, the VVL device 400 is capable of switching the operation characteristic of the intake valve 118 in the three stages. However, the VVL device 400 may be capable of switching the operation characteristic of the intake valve 118 in two stages.

Figure 17:
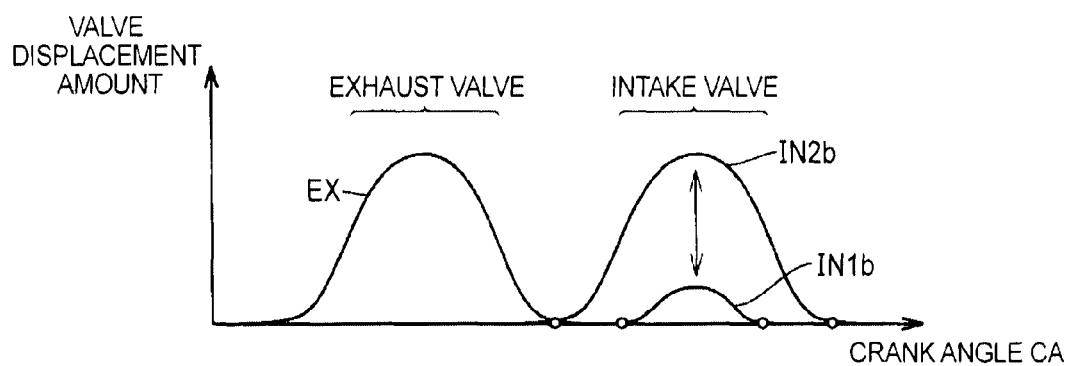
FIG. 17 is a diagram illustrating a valve displacement amount-crank angle relationship that is realized by a VVL device which is capable of switching the operation characteristic of the intake valve in two stages.

FIG. 17 is a diagram illustrating a valve displacement amount-crank angle relationship that is realized by a VVL device 400A which is capable of switching the operation characteristic of the intake valve 118 in the two stages.

Referring to FIG. 17, the VVL device 400A is capable of switching the operation characteristic of the intake valve 118 into any of the first characteristic (small cam characteristic) that is illustrated by a waveform IN1*b* and the second characteristic (large cam characteristic) that is illustrated by a waveform IN2*b*.

Figure 18:
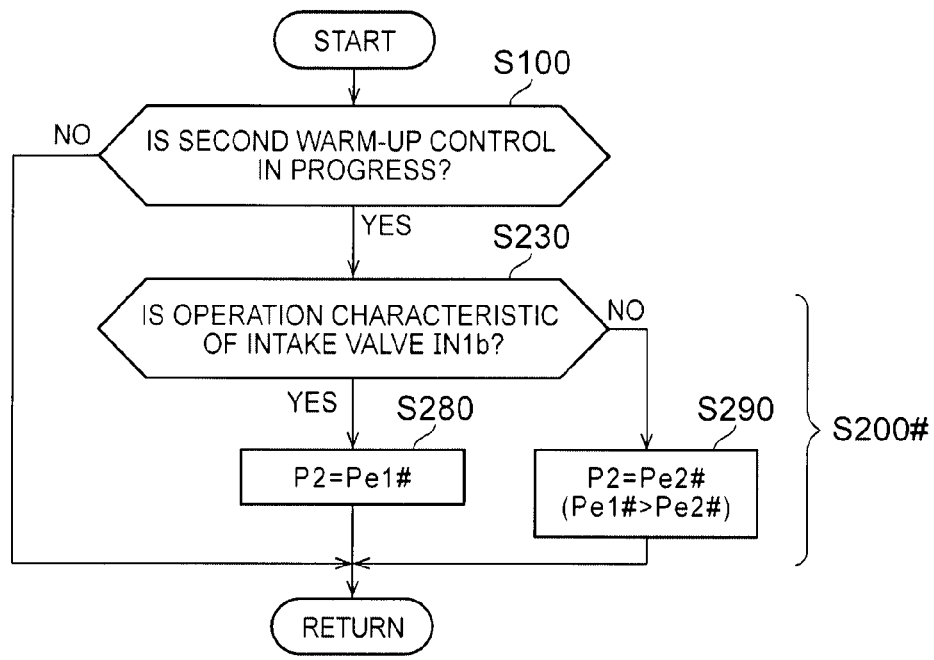
FIG. 18 is a flowchart showing engine output setting during the second warm-up control in a case where the catalyst warm-up control according to the first embodiment is performed by applying the VVL device that has the operation characteristic which is illustrated in FIG. 17.

Catalyst warm-up control similar to that of the first embodiment can be applied even to the engine in which the operation characteristic of the intake valve 118 is changed in the two stages. However, setting of the engine output during the second warm-up control in the catalyst warm-up control is executed in accordance with the flowchart that is illustrated in FIG. 18 instead of the flowchart that is illustrated in FIG. 14. The control processing that is illustrated in FIG. 18 is repeatedly executed for each predetermined control period by the controller 200 during the execution of the catalyst warm-up control.

FIG. 18 is a flowchart showing the engine output setting during the second warm-up control in a case where the catalyst warm-up control according to the first embodiment is performed by applying the VVL device 400A.

Referring to FIG. 18, the controller 200 determines whether or not the second warm-up control is in progress in Step S100, which is the same as in FIG. 14. If the second warm-up control is being executed (YES determination in S100), the controller 200 sets the second operating power P2 depending on the operation characteristic of the intake valve in Step S200#. Step S200# has the following Steps S230, S280, and S290.

In Step S230, the controller 200 distinguishes whether the present operation characteristic of the intake valve 118 is the small cam characteristic (IN1*b*) or the large cam characteristic (IN2*b*). The determination in Step S230 can be executed based on the detection value Lv from the VVL position sensor 311 (FIG. 2) as is the case with Steps S210 and S220 (FIG. 14).

When the operation characteristic of the intake valve 118 is the small cam characteristic (IN1*b*) (YES determination in S230), the controller 200 allows the processing to proceed to Step S280. When the operation characteristic of the intake valve 118 is the large cam characteristic (IN2*b*) (NO determination in S230), the controller 200 allows the processing to proceed to Step S290.

In Step S280, the controller 200 sets P2 to be equal to Pe1#. Likewise, in Step S290, the controller 200 sets P2 to be equal to Pe2#. Pe1# and Pe2# can be set according to the characteristic line 500 that is illustrated in FIG. 13. In other words, Pe1 # that is set for the small cam is set to be higher than Pe2# that is set for the large cam (Pe1#>Pe2#).

When the second warm-up control is not being executed (NO determination value in S100), the controller 200 does not execute the processing of S200#.

As described above, the engine output (second operating power P2) during the second warm-up control can be set in conjunction with the present operation characteristic of the intake valve 118 in accordance with the characteristic relationship (characteristic line 500) illustrated in FIG. 13 by the processing of Step S200# even in a case where the VVL device that is capable of switching the operation characteristic of the intake valve 118 in the two stages is applied.

In this configuration, the operation characteristics of the intake valve 118 is limited to two, that is, the valve lift and the valve operating angle, and thus the time required for setting a control parameter for controlling the operation state of the engine 100 appropriate can be further reduced. In addition, the configuration of the actuator can also be further simplified.

The operation characteristics of the intake valve 118, that is, the valve lift and the valve operating angle, are not limited to change in two stages or in three stages and can be changed in any number of stages exceeding three.

Alternatively, although not particularly illustrated, the operation characteristic of the intake valve 118 can also be changed continuously (stagelessly). For example, the operation characteristic of the intake valve 118 during the second warm-up control may be continuously changed from the small cam characteristic to the large cam characteristic. In this case, the engine output (second operating power P2) can be set depending on the detection value (current value) of the operation characteristic of the intake valve 118 in accordance with the characteristic line 500 illustrated in FIG. 13 during the second warm-up control.

As described above, the catalyst warm-up control in the hybrid vehicle according to this first embodiment can be applied without limiting how the operation characteristic (valve lift and valve operating angle) of the intake valve 118 is changed (continuously/in stages, and in how many stages during the change in stages).

In the first embodiment, the engine output (second operating power P2) during the second warm-up control is set to be changed in accordance with the operation characteristic of the intake valve. In this case, the emission and fuel economy deteriorations can be prevented even in a case where the operation characteristic of the intake valve 118 is changed during the second warm-up control as illustrated in FIGS. 15 and 16.

In a case where the control by the VVL device is normal, the operation characteristic of the intake valve 118 can be appropriately changed even if the engine output (second operating power P2) is set to a value suitable for the catalyst warm-up control. Even in this case, the engine output (second operating power P2) and the operation characteristic of the intake valve 118 can be set in conjunction during the second warm-up control.

In a second embodiment, catalyst warm-up control in a hybrid vehicle that uses both separately during second warm-up control will be described.

Figure 19:
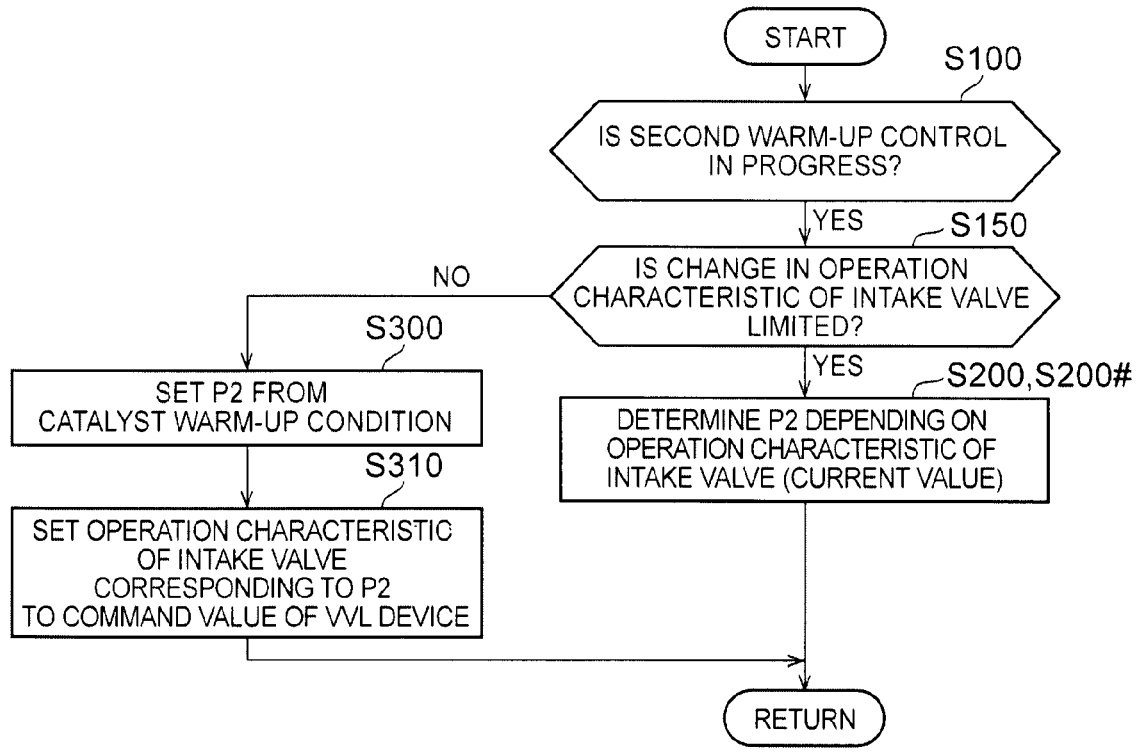
FIG. 19 is a flowchart showing control processing for second warm-up control in catalyst warm-up control in a hybrid vehicle according to a second embodiment of the invention.

FIG. 19 is a flowchart showing control processing for the second warm-up control in the catalyst warm-up control in the hybrid vehicle according to the second embodiment of the invention. The control processing that is illustrated in FIG. 19 is repeatedly executed for each predetermined control period by the controller 200 during, for example, the execution of the catalyst warm-up control.

Referring to FIG. 19, the controller 200 determines whether or not the second warm-up control is in progress in Step S100, which is the same as in FIG. 14. If the second warm-up control is in progress (YES determination in S100), the controller 200 allows the processing to proceed to Step S150 and determines whether or not the change in the operation characteristic of the intake valve 118 is limited.

A YES determination is made in Step S150 in a case where, for example, the detection value Lv of the VVL position sensor 311 does not follow command values of the valve lift and the valve operating angle of the intake valve with respect to the VVL device 400 (400A). In Step S150, the YES determination can be made not only in a case where the operation characteristic is completely fixed due to the malfunctioning of the VVL device 400 (400A) but also in a situation in which the operation characteristic is temporarily fixed due to the fixation in a low temperature as described above, an increase in frictional resistance, the temporary presence of the foreign matter, or the like.

In a case where the change in the operation characteristic of the intake valve 118 is limited (YES determination in S150), the controller 200 determines the engine output (second operating power P2) depending on the operation characteristic (current value) of the intake valve 118 during the second warm-up control in Step S200 (FIG. 14) or in Step S200# (FIG. 17) as described in the first embodiment.

In contrast, the controller 200 allows the processing to proceed to Step S300 in a case where the control of the operation characteristic of the intake valve 118 is normal (NO determination in S250). Then, the controller 200 sets the engine output (second operating power P2) during the second warm-up control from a catalyst warm-up condition.

As described in the first embodiment, the engine output during the second warm-up control needs to be set within a range not exceeding the exhaust purification capacity of the S/C catalyst 112S. The exhaust purification capacity of the S/C catalyst 112S increases in response to the rise in the catalyst temperature. Accordingly, the time required for the catalyst warm-up control can be expected to be shortened if the engine output (second operating power P2) is allowed to rise in response to a rise in the catalyst purification rate by the rise in the catalyst temperature.

Figure 20:
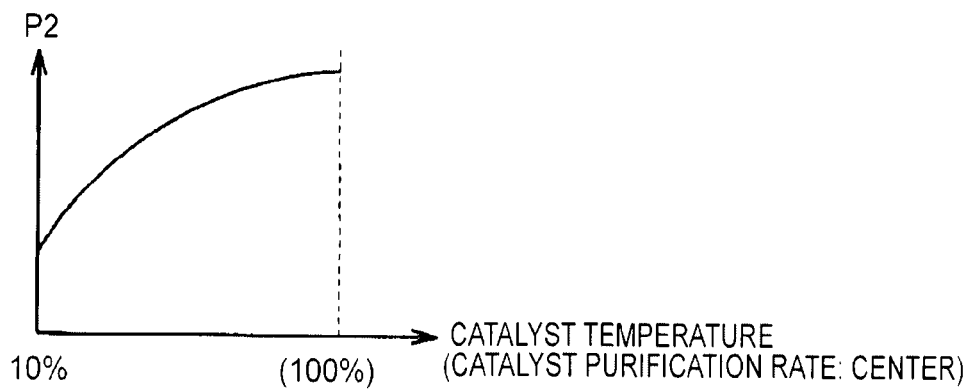
FIG. 20 is a conceptual diagram showing an example of engine output setting during second warm-up control in catalyst warm-up control at a time when control of an operation characteristic of an intake valve is normal.

Accordingly, in Step S300, the second operating power P2 can be set to be variable in response to the catalyst temperature as illustrated in FIG. 20 for example.

Referring to FIG. 20, the second operating power P2 is set to increase as the catalyst temperature increases in a case where the engine output during the second warm-up control is set from the catalyst warm-up condition. Alternatively, the second operating power P2 may be set depending on the catalyst purification rate (central purification rate) that is estimated based on the catalyst temperature and is illustrated in FIG. 11 and the like instead of directly using the catalyst temperature.

Referring back to FIG. 19, the controller 200 sets the operation characteristic of the intake valve 118 corresponding to the second operating power P2 that is set in Step S300 to the command value of the VVL device 400 (400A) in Step S310. For example, the command value can be set for the operation characteristic of the intake valve 118 with respect to the second operating power P2 to be selected through an inverse operation in accordance with the characteristic line 500 that is illustrated in FIG. 13.

In this manner, the operation characteristic (valve lift and valve operating angle) of the intake valve can be controlled to be a proper value that does not cause the emission or fuel economy deterioration with respect to the engine output (second operating power P2) set in Step S300 since the VVL device 400 (400A) is operated in accordance with the command value.

In the hybrid vehicle according to the second embodiment, the engine output (second operating power P2) during the second warm-up control can be set from the catalyst warm-up condition in a case where the control of the operation characteristic of the intake valve 118 is normal as described above. Then, the time required for the catalyst warm-up control can be shortened in addition to the effects of the first embodiment.

As is the case with the first embodiment, the catalyst warm-up control in the hybrid vehicle according to this second embodiment can be applied without limiting how the operation characteristic (valve lift and valve operating angle) of the intake valve 118 is changed (continuously/in stages, and in how many stages during the change in stages).

Other Modification Examples

In the first and second embodiments described above, the S/C catalyst 112S of the previous stage and the U/F catalyst 112U of the subsequent stage constitute the exhaust emission control device (FIG. 2) with regard to the S/C catalyst 112S, switching from the first warm-up control to the second warm-up control is performed when the end face purification rate of the S/C catalyst 112S reaches 100%, and switching from the catalyst warm-up control (second warm-up control) to the normal control is performed when the central purification rate of the S/C catalyst 112S reaches 100%.

Instead of this configuration, the switching from the first warm-up control to the second warm-up control may be performed when the purification rate (central purification rate) of the S/C catalyst 112S of the previous stage reaches 100% and the switching from the catalyst warm-up control (second warm-up control) to the normal control may be performed when the purification rate (central purification rate) of the U/F catalyst 112U of the subsequent stage reaches 100%.

Figure 21:
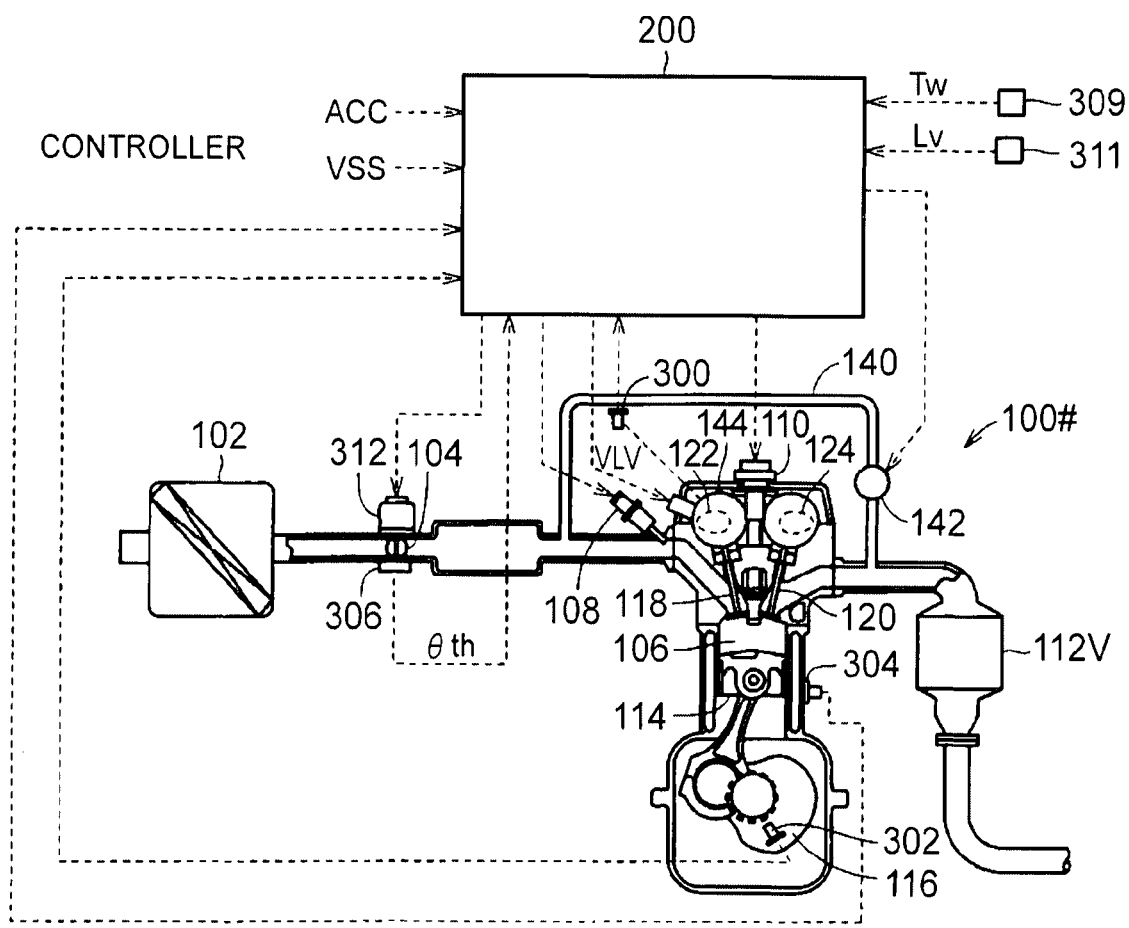
FIG. 21 is another configuration diagram of the engine that is illustrated in FIG. 1.

Alternatively, a single catalyst 112V may constitute the exhaust emission control device as illustrated in FIG. 21 without having to divide the exhaust emission control device into the S/C catalyst 112S and the U/F catalyst 112U, and the switching from the first warm-up control to the second warm-up control may be performed when an end face purification rate of the catalyst 112V reaches 100% and the switching from the catalyst warm-up control (second warm-up control) to the normal control may be performed when a central purification rate of the catalyst 112V reaches 100%.

In the first and second embodiments described above, a case where both the valve lift and the valve operating angle are controlled as the operation characteristics of the intake valve 118 has been described. However, the invention can also be applied to a configuration in which only the valve lift can be controlled (can be changed) as the operation characteristic of the intake valve 118 and can also be applied to a configuration in which only the valve operating angle can be controlled (can be changed) as the operation characteristic of the intake valve 118. Even in the configuration in which any one of the valve lift and the valve operating angle can be controlled (can be changed) as the operation characteristic of the intake valve 118, effects similar to those in a case where both the valve lift and the valve operating angle of the intake valve 118 can be changed can be attained. The configuration in which only one of the valve lift and the valve operating angle of the intake valve 118 can be controlled (can be changed) can be realized by using a known technique.

In the configuration in which only one of the valve lift and the valve operating angle of the intake valve 118 can be controlled (can be changed), the VVL position sensor 311 is arranged to detect the one of the valve lift and the valve operating angle and a similar catalyst warm-up control can be applied thereto so that the determination for each of the valve lift and the valve operating angle according to the embodiments described above can be made for the one of the valve lift and the valve operating angle. In this manner, the invention can be applied to the hybrid vehicle that is provided with a variable valve mechanism which is capable of changing at least one of the valve lift and the valve operating angle as the operation characteristic of the intake valve 118 continuously (stagelessly) or discretely (in stages).

In addition, the hybrid vehicle described above is a series/parallel type hybrid vehicle that is capable of transmitting the power of the engine 100 to the drive wheels 6 and the motor generators MG1, MG2 after splitting the power of the engine 100 by using the power split device 4. However, the invention can also be applied to other types of hybrid vehicles. In other words, the invention can also be applied to, for example, a so-called series type hybrid vehicle in which the engine 100 is used to drive only the motor generator MG1 and the vehicle driving force is generated by the motor generator MG2 alone, a hybrid vehicle in which only regenerative energy is recovered as electric energy from kinetic energy generated by the engine 100, and a motor assist type hybrid vehicle in which the engine is used as main power and a motor provides assistance if necessary. In addition, the invention can also be applied to a hybrid vehicle that travels only by the power of the engine with the motor disconnected.

In each of the embodiments described above, the controller 200 controls the power of the engine 100 (to the first or second operating power) when it comes to the output of the engine 100. However, the controller 200 may control the torque of the engine 100 (torque demand control). In other words, the controller 200 may operate the engine 100 so that the engine 100 outputs a first torque during the first warm-up control and may operate the engine 100 so that the engine 100 outputs a second torque (second torque>first torque) during the second warm-up control. In this case, the engine output during the catalyst warm-up control is controlled so that a first operating point is set during the first warm-up control for the torque of the engine 100 to be the first torque and a second operating point is set during the second warm-up control for the torque of the engine 100 to be the second torque.

In the above description, the motor generator MG2 corresponds to an example of the "electric motor" according to the invention and each of the engines 100, 100# corresponds to an example of the "internal combustion engine" according to the invention. In addition, each of the VVL devices 400, 400A corresponds to an example of the "variable valve actuating device" according to the invention. The characteristic points 501 to 503 and the characteristic line 500 illustrated in FIG. 13 correspond to an example of "predetermined characteristic relationships" according to the invention.

The embodiments disclosed herein are expected to be combined with each other as appropriate. It should be noted that the embodiment disclosed herein is exemplary in every aspect and does not limit the invention. The scope of the invention is clarified by the claims, not the description above, and the invention includes any change within the meaning and range equivalent to the claims.

The invention claimed is:

1. A hybrid vehicle comprising:
an electric motor configured to generate a driving force for the vehicle;
an internal combustion engine including a variable valve actuating device, the variable valve actuating device being configured to control at least one of a valve lift and a valve operating angle as an operation characteristic of an intake valve;
an exhaust emission control device configured to control an exhaust emission of the internal combustion engine by using a catalyst; and
a controller configured to
(a) execute catalyst warm-up control, the catalyst warm-up control being control for performing warm-up of the catalyst of the exhaust emission control device and the catalyst warm-up control including first warm-up control and second warm-up control,
the first warm-up control being control for operating the internal combustion engine at a first operating point, and
the second warm-up control being control for operating the internal combustion engine at a second operating point, regardless of the driving force required for traveling, after the execution of the first warm-up control, and an output of the internal combustion engine at the second operating point being larger than an output of the internal combustion engine at the first operating point,
(b) operate the internal combustion engine with ignition timing of the internal combustion engine during the execution of the first warm-up control further on a retard side than ignition timing of the internal combustion engine during the execution of the second warm-up control, and
(c) set the output of the internal combustion engine and the operation characteristic of the intake valve in accordance with a predetermined characteristic relationship during the execution of the second warm-up control, the predetermined characteristic relationship being a relationship in which the output of the internal combustion engine and the operation characteristic of the intake valve correspond to each other, the predetermined characteristic relationship being determined such that the output of the internal combustion engine decreases as at least one of the valve lift and the valve operating angle increases;
wherein the controller controls the electric motor, such that the electric motor outputs the driving force required for the traveling, during the execution of the first warm-up control and during the execution of the second warm-up control.

2. The hybrid vehicle according to claim 1, further comprising:
a detector configured to detect the operation characteristic of the intake valve, wherein
the output of the internal combustion engine is changed depending on a present operation characteristic of the intake valve in accordance with the characteristic relationship, when the second warm-up control is executed and when the operation characteristic of the intake valve is changed, the present operation characteristic of the intake valve being detected by the detector.

3. The hybrid vehicle according to claim 1, wherein
the controller is configured to set the output of the internal combustion engine in accordance with the characteristic relationship depending on a present operation characteristic of the intake valve, when the second warm-up control is executed and when a change in the operation characteristic of the intake valve by the variable valve actuating device is limited, and
the variable valve actuating device is configured to change the operation characteristic of the intake valve in accordance with the characteristic relationship depending on the output of the internal combustion engine set for the catalyst warm-up control when the second warm-up control is executed and the change in the operation characteristic of the intake valve by the variable valve actuating device is not limited.

4. The hybrid vehicle according to claim 3, wherein the controller is configured to increase the output of the internal combustion engine depending on a rise in a temperature of the catalyst, when the second warm-up control is executed and when the change in the operation characteristic of the intake valve by the variable valve actuating device is not limited.

5. The hybrid vehicle according to claim 1, wherein the variable valve actuating device is configured to change the operation characteristic of the intake valve into a first characteristic or a second characteristic, at least one of the valve lift and the valve operating angle at a time when the operation characteristic of the intake valve is the second characteristic is larger than at least one of the valve lift and the valve operating angle at a time when the operation characteristic of the intake valve is the first characteristic, and the characteristic relationship is determined such that the output of the internal combustion engine at a time when the operation characteristic of the intake valve is the second characteristic is lower than the output of the internal combustion engine at a time when the operation characteristic of the intake valve is the first characteristic.

6. The hybrid vehicle according to claim 1, wherein the variable valve actuating device is configured to change the operation characteristic of the intake valve into a first characteristic, a second characteristic, or a third characteristic, wherein at least one of the valve lift and the valve operating angle at a time when the operation characteristic of the intake valve is the second characteristic is larger than at least one of the valve lift and the valve operating angle at a time when the operation characteristic of the intake valve is the first characteristic and at least one of the valve lift and the valve operating angle at a time when the operation characteristic of the intake valve is the third characteristic is larger than at least one of the valve lift and the valve operating angle at a time when the operation characteristic of the intake valve is the second characteristic, and the characteristic relationship is determined such that the output of the internal combustion engine at a time when the operation characteristic is the second characteristic is lower than the output of the internal combustion engine at a time when the operation characteristic is the first characteristic and the output of the internal combustion engine at a time when the operation characteristic is the third characteristic is lower than the output of the internal combustion engine at a time when the operation characteristic is the second characteristic.

7. The hybrid vehicle according to claim 1, wherein the first warm-up control is control for warming up an exhaust upstream side of the catalyst and the second warm-up control is control for warming up whole of the catalyst.

8. A controller for a hybrid vehicle, the hybrid vehicle including an electric motor, an internal combustion engine, and an exhaust emission control device, the electric motor being configured to generate a driving force for the vehicle, the internal combustion engine including a variable valve actuating device, the variable valve actuating device being configured to control at least one of a valve lift and a valve operating angle as an operation characteristic of an intake valve, and the exhaust emission control device being configured to control an exhaust emission of the internal combustion engine by using a catalyst, the controller comprising:

first warm-up control means for operating the internal combustion engine at a first operating point;

second warm-up control means for operating the internal combustion engine at a second operating point, an output of the internal combustion engine at the second operating point being larger than an output of the internal combustion engine at the first operating point;

ignition timing setting means for setting ignition timing of the internal combustion engine during the operation of the internal combustion engine by the first warm-up control means further on a retard side than ignition timing of the internal combustion engine during the operation of the internal combustion engine by the second warm-up control means; and operation characteristic setting means for setting the output of the internal combustion engine and the operation characteristic of the intake valve during the operation of the internal combustion engine by the second warm-up control means in accordance with a predetermined characteristic relationship, the predetermined characteristic relationship being a relationship in which the output of the internal combustion engine and the operation characteristic of the intake valve correspond to each other, the predetermined characteristic relationship being determined such that the output of the internal combustion engine decreases as at least one of the valve lift and the valve operating angle increases;

wherein the controller controls the electric motor, such that the electric motor outputs the driving force required for the traveling, during the execution of the first warm-up control and during the execution of the second warm-up control.

9. A control method for a hybrid vehicle, the hybrid vehicle including an electric motor, an internal combustion engine, an exhaust emission control device, and a controller, the electric motor being configured to generate a driving force for the vehicle, the internal combustion engine including a variable valve actuating device, the variable valve actuating device being configured to control at least one of a valve lift and a valve operating angle as an operation characteristic of an intake valve, and the exhaust emission control device being configured to control an exhaust emission of the internal combustion engine by using a catalyst, the control method comprising:

performing first warm-up control by the controller, the first warm-up control being control for operating the internal combustion engine at a first operating point;

performing second warm-up control by the controller, the second warm-up control being control for operating the internal combustion engine at a second operating point and an output of the internal combustion engine at the second operating point being larger than an output of the internal combustion engine at the first operating point;

operating the internal combustion engine, by the controller, with ignition timing of the internal combustion engine during an execution of the first warm-up control further on a retard side than ignition timing of the internal combustion engine during an execution of the second warm-up control;

setting the output of the internal combustion engine and the operation characteristic of the intake valve in accordance with a predetermined characteristic relationship by the controller during the execution of the second warm-up control, the predetermined characteristic relationship being a relationship in which the output of the internal combustion engine and the operation characteristic of the intake valve correspond to each other, the predetermined characteristic relationship being determined such that the output of the internal combustion engine decreases as at least one of the valve lift and the valve operating angle increases; and controlling the electric motor, such that the electric motor outputs the driving force required for the traveling, during the execution of the first warm-up control and during the execution of the second warm-up control.

* * * * *